US009031094B2

(12) United States Patent
Masputra et al.

(10) Patent No.: US 9,031,094 B2
(45) Date of Patent: May 12, 2015

(54) SYSTEM AND METHOD FOR LOCAL FLOW CONTROL AND ADVISORY USING A FAIRNESS-BASED QUEUE MANAGEMENT ALGORITHM

(75) Inventors: Cahya Masputra, San Jose, CA (US); Padmavathy Bhooma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 13/621,043

(22) Filed: Sep. 15, 2012

(65) Prior Publication Data
US 2013/0201997 A1 Aug. 8, 2013

Related U.S. Application Data

(60) Provisional application No. 61/595,003, filed on Feb. 3, 2012.

(51) Int. Cl.
*H04L 12/28* (2006.01)
*H04L 12/869* (2013.01)

(52) U.S. Cl.
CPC .................................... *H04L 47/60* (2013.01)

(58) Field of Classification Search
CPC .. H04L 47/60; H04L 47/6215; H04L 47/2441
USPC ......................................................... 370/469
See application file for complete search history.

(56) References Cited

U.S. PATENT DOCUMENTS

| 7,230,921 | B2 | 6/2007 | Eriksson et al. | |
|---|---|---|---|---|
| 7,437,473 | B2 | 10/2008 | Lu et al. | |
| 7,782,869 | B1 | 8/2010 | Chitlur Srinivasa | |
| 7,782,870 | B1 | 8/2010 | Tripathi et al. | |
| 7,840,685 | B2 | 11/2010 | Wyld | |
| 8,028,060 | B1 | 9/2011 | Wyld et al. | |
| 8,045,561 | B1 | 10/2011 | Varma et al. | |
| 8,767,772 | B2 * | 7/2014 | Masputra et al. | 370/468 |
| 8,780,722 | B2 * | 7/2014 | Masputra et al. | 370/235 |
| 8,787,168 | B2 * | 7/2014 | Masputra et al. | 370/235 |
| 8,787,169 | B2 * | 7/2014 | Masputra et al. | 370/235 |
| 8,812,005 | B2 * | 8/2014 | Masputra et al. | 455/445 |

FOREIGN PATENT DOCUMENTS

| EP | 1317110 A1 | 6/2003 |
|---|---|---|
| EP | 1376948 A1 | 1/2004 |

OTHER PUBLICATIONS

International Search Report on and the Written Opinion of the International Searching Authority, mailing date May 21, 2013, for corresponding International Application No. PCT/US2013/023492, 9 pages.
International Search Report on and the Written Opinion of the International Searching Authority, mailing date May 21, 2013, for corresponding International Application No. PCT/US2013/023491, 10 pages.
Xiao et al., "Internet QOS: A Big Picture", IEEE Network, IEEE Service Center, Mar. 1, 1999, pp. 8-18, vol. 13, No. 3, New York, NY.

* cited by examiner

*Primary Examiner* — Melvin Marcelo
(74) *Attorney, Agent, or Firm* — Park, Vaughan, Fleming & Dowler LLP

(57) ABSTRACT

A data processing device for transmitting network packets comprising: packet classification logic for classifying packets according to different packet service classifications, wherein a packet to be transmitted is stored in one or more transmit queues based on the packet service classifications and wherein each packet is associated with a particular flow; and queue management logic for queuing packets in the one or more transmit queues utilizing a flow control policy implemented on a per-flow basis, wherein a number of queued packets for each flow is monitored and when the number of queued packets for a particular flow reaches a specified threshold, then flow control for that particular flow is turned on, and wherein the queue management logic implements a stochastic fair blue (SFB) algorithm to track the number of packets within each transmit queue.

42 Claims, 22 Drawing Sheets

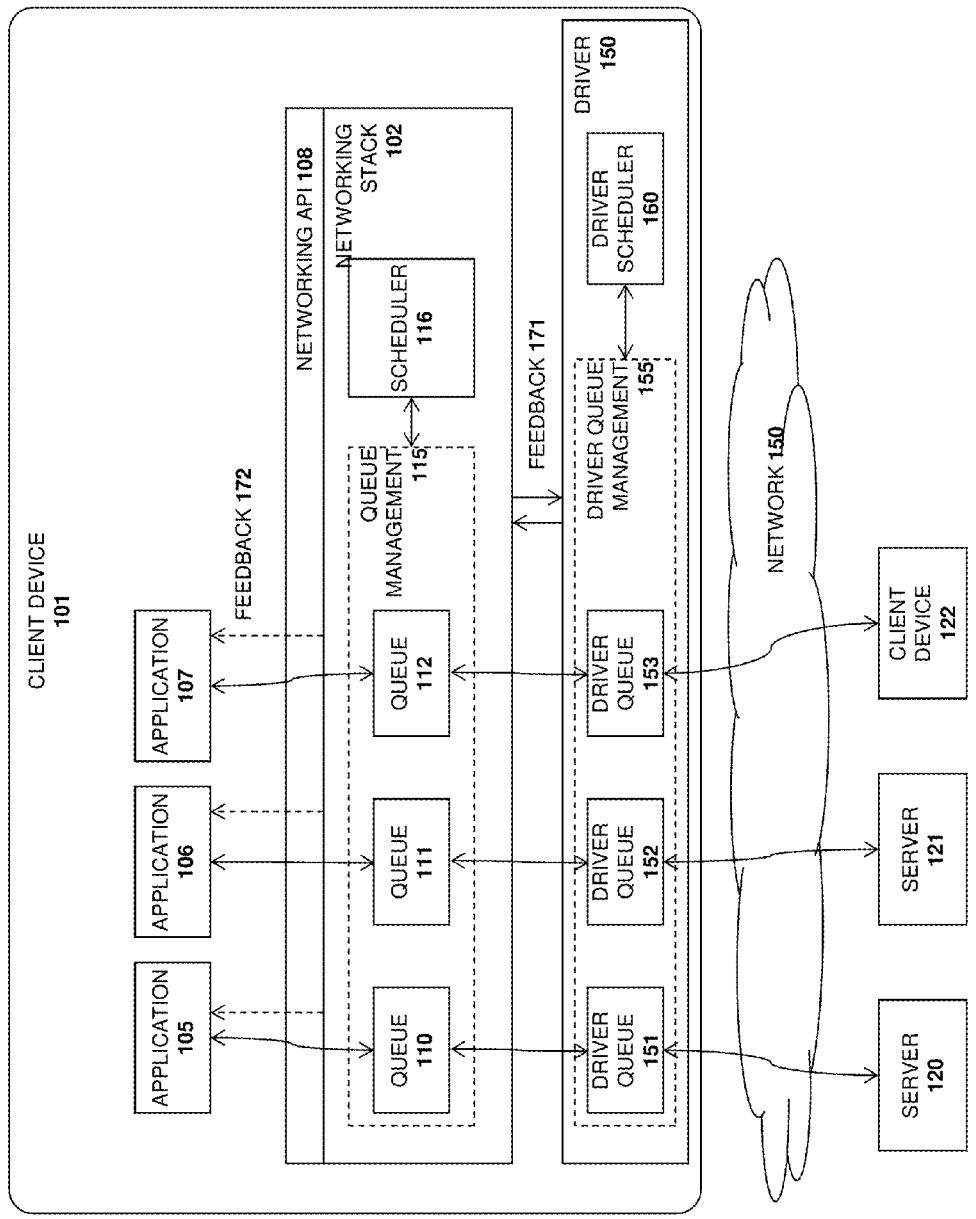

```
altq on en1 qfq queue { q_bk_sys, q_bk, q_be, q_rd, q_oam, q_av, q_rv,
q_vi, q_vo, q_ctl }
    queue q_bk_sys weight 300   qlimit 256 qfq (tmax 1200 sfb fc)
    queue q_bk     weight 600   qlimit 256 qfq (tmax 1400 sfb fc)
    queue q_be     weight 2400  qlimit 256 qfq (tmax 600  sfb fc default)
    queue q_rd     weight 2700  qlimit 256 qfq (tmax 600  sfb fc)
    queue q_oam    weight 3000  qlimit 256 qfq (tmax 400  sfb fc)
    queue q_av     weight 8000  qlimit 256 qfq (tmax 1000 sfb fc)
    queue q_rv     weight 15000 qlimit 256 qfq (tmax 1200 sfb fc)
    queue q_vi     weight 20000 qlimit 256 qfq (tmax 1400 sfb fc)
    queue q_vo     weight 23000 qlimit 256 qfq (tmax 200  sfb fc)
    queue q_ctl    weight 25000 qlimit 256 qfq (tmax 200  sfb fc)

pass on en1 sc bk_sys queue (q_bk_sys)
pass on en1 sc bk     queue (q_bk)
pass on en1 sc be     queue (q_be)
pass on en1 sc rd     queue (q_rd)
pass on en1 sc oam    queue (q_oam)
pass on en1 sc av     queue (q_av)
pass on en1 sc rv     queue (q_rv)
pass on en1 sc vi     queue (q_vi)
pass on en1 sc vo     queue (q_vo)
```

*FIG. 9B*

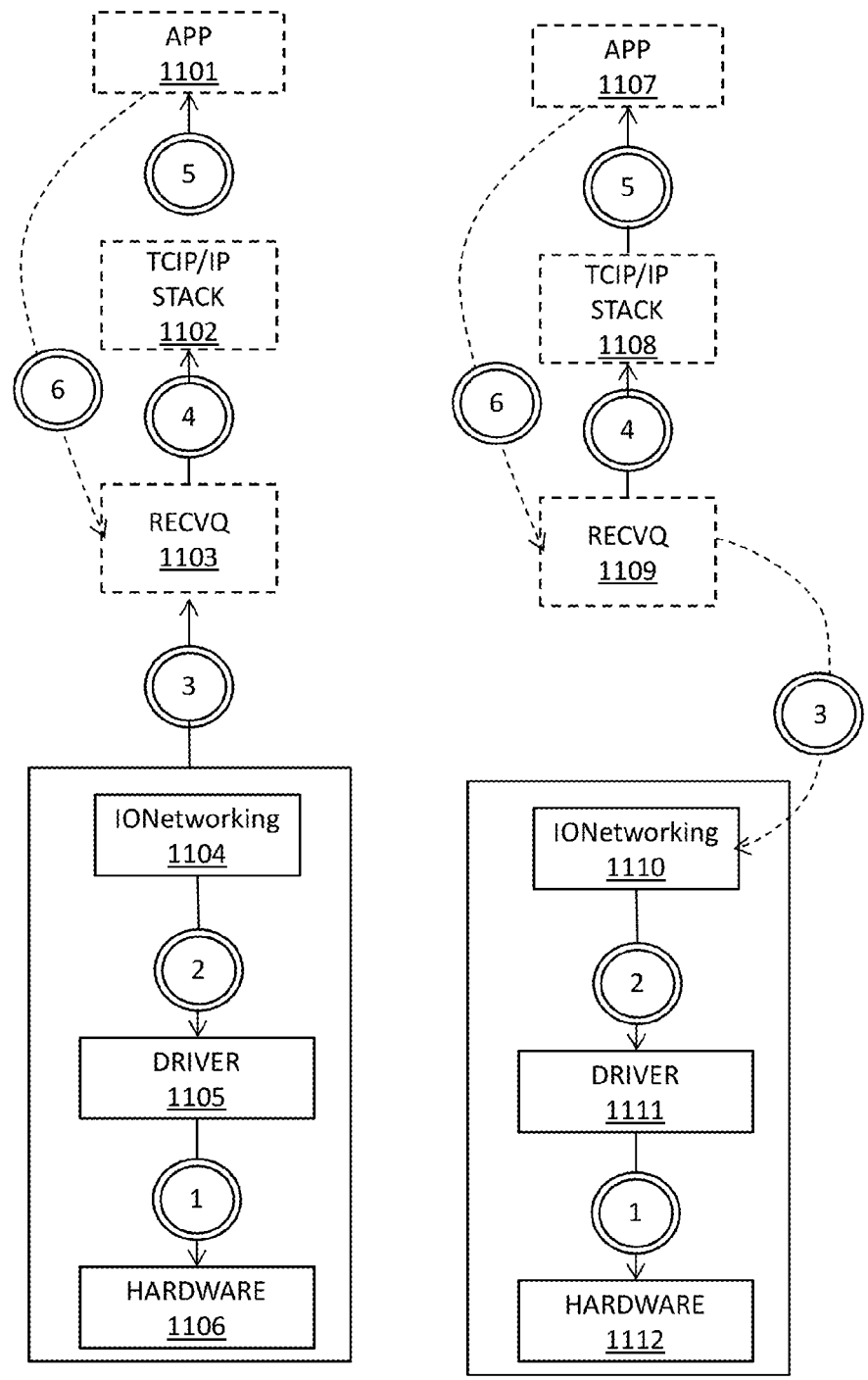

SYSTEM AND METHOD FOR LOCAL FLOW CONTROL AND ADVISORY USING A FAIRNESS-BASED QUEUE MANAGEMENT ALGORITHM

CROSS-REFERENCE TO RELATED APPLICATIONS

This application is related to, and claims the benefit of U.S. Provisional Patent Application No. 61/595,003, filed Feb. 3, 2012, entitled "SYSTEM AND METHOD FOR INTELLIGENT NETWORK QUEUE MANAGEMENT", by Cahya Masputra, et al., which is hereby incorporated by reference herein in its entirety.

CROSS-REFERENCE TO RELATED APPLICATIONS

This application is related to concurrently filed U.S. application Ser. Nos. 13/620,920, 13/620,951, 13/620,988, 13/621,027, 13/621,056, 13/621,079, 13/621,091, 13/621,100, and 13/621,110 filed Sep. 15, 2012 by Cahya Masputra et al., assigned to Apple.

An embodiment of the invention is directed to managing data network communications in a client device. Other embodiments are also described.

BACKGROUND

A data network allows people to communicate with each other and obtain information from various sources on the network, using their respective client devices that are "on" the network. For example, a Web browser application program, running in a user's workstation or laptop computer, can connect with a Web server to download a Web page. The connection may span several intermediate nodes or hops of the network, which may include specialized computers such as routers. These devices can discover routes between the end nodes through which they can forward messages that have been broken up into packets of data. Each node may be assigned a unique or global address, such as an Internet Protocol (IP) address. The Internet is a well known global internetwork in which networks of computers are connected to each other via routers.

Computer network protocols have a layered architecture. Typically, the upper most layer includes the functionality provided by an application program, such as a Web browser. This is the layer that, at least in the end nodes, may initiate a connection between two computers over a network. Thus, for example, a user may select a desired Website on his computer. The Web browser (running in that computer) starts a procedure that results in a connection being made with a server that is associated with the selected Website. The Web browser sends the request "down" through a series of functions referred to as an Internet protocol suite or Transport Control Protocol/Internet protocol (TCP/IP) stack. This stack of protocols is typically implemented in software at its higher layers, often as part of an operating system (OS) program running in the client device. Once the selected Website has been translated into an IP address of a Web server, the server is contacted over the Internet, and an appropriate connection is made with an upper layer program of a similar protocol suite implemented in the Web server.

To use the connection, the TCP/IP stack in the user's computer encapsulates a request message from the Web browser, in this example, a request identifying the Web page. The message may be encapsulated more than once, by several vertical layers on its way down in the protocol stack, including a network access layer. It finally arrives at the lowest layer of the client device, namely the physical layer (which is typically deemed to be a part of the network access layer).

After leaving the physical layer of the user's computer and then making its way through one or more hops in the network, the message from the Web browser arrives in the Web server, and is passed "up" the protocol stack in the Web server to a program that is deemed a peer of the Web browser. The peer program may then respond to the message, by causing the data for the requested Web page to be collected and sent back to the user's computer through the existing network connection. The data is broken up into multiple messages or packets, and is sent in a manner analogous to how the request message was sent.

An application program can have several applications or processes that are executed by one or more processors in the user's client computer. Each individual application may generate different types of network data traffic which may have different packet loss, latency, and flow elasticity requirements. By way of example, a social networking application may communicate control data, text, audio, and video over the network, each of which have different requirements with respect to the above variables. Each application is typically provided with its own port or group of ports to communicate this data, though they may all share the same lower layer network resources in the user's computer. In current implementations, the routers interconnecting each client device to a particular destination node (i.e., another client or a server) over the network include large transmit and receive buffers. As such, there is little or no packet loss and client devices are typically permitted to transmit packets without regard to flow control, resulting in "buffer bloat" within the router queues. Protocols such as TCP are self-tuning protocols which determine congestion and modify transmission speed based on detected packet loss.

Additionally, in current client-side implementations, the buffering of packets occurs at the driver level. The TCP/IP stack simply pushes packets down to the driver and the driver manages its own transmit and receive queues. Because of the large amount of buffering performed at the driver level within the client (an Ethernet driver can buffer up to 4000 packets in a queue prior to transmission), the networking stack is not provided with accurate network/congestion information. As such, what is needed is a more intelligent mechanism for performing network queuing within a client device in which a feedback channel is utilized used between the driver layer and the network stack layer.

SUMMARY

A data processing device for transmitting network packets comprising: packet classification logic for classifying packets according to different packet service classifications, wherein a packet to be transmitted is stored in one or more transmit queues based on the packet service classifications and wherein each packet is associated with a particular flow; and queue management logic for queuing packets in the one or more transmit queues utilizing a flow control policy implemented on a per-flow basis, wherein a number of queued packets for each flow is monitored and when the number of queued packets for a particular flow reaches a specified threshold, then flow control for that particular flow is turned on, and wherein the queue management logic implements a stochastic fair blue (SFB) algorithm to track the number of packets within each transmit queue.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 1A-B illustrate block diagrams of a client device with a networking stack in accordance with embodiments of the invention.

FIG. 9B illustrates an example of a packet filter (PF) configuration in accordance with one embodiment.

FIGS. 11A-B illustrate communication between a networking stack and a driver for receiving data packets in accordance with two different embodiments of the invention.

DETAILED DESCRIPTION

Figure 1B:
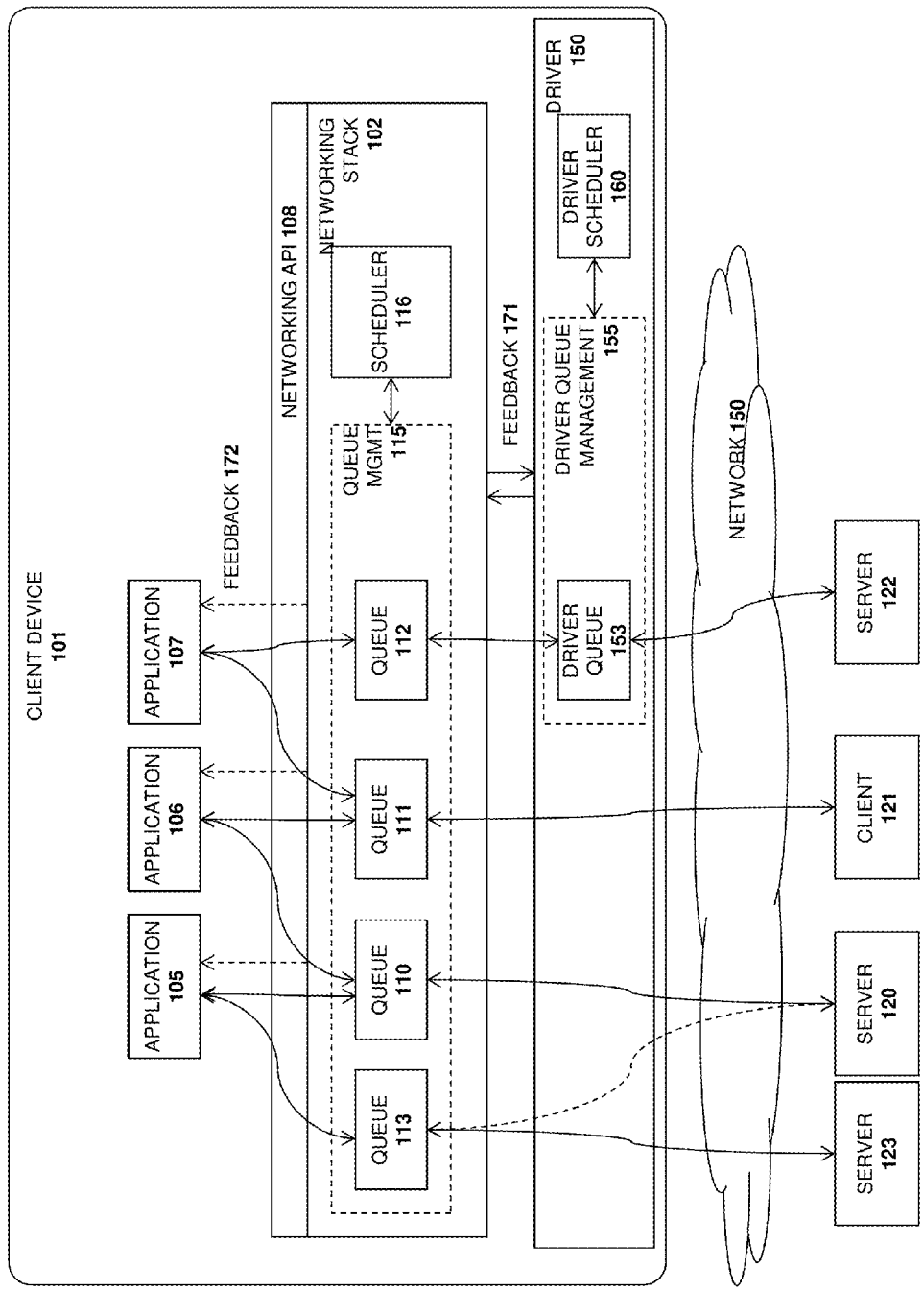

An embodiment of the invention is directed to a computer-implemented method for active queue management for networking applications executed on a client device.

FIG. 1A is a block diagram of a client computing device 101 on which embodiments of the invention may be implemented. The illustrated client device 101 executes a plurality of applications 105-107 which communicate with servers 120-121 and other client devices 122 over a network 150 such as the Internet. The servers 120-121 may include (by way of example and not limitation) Web servers, email servers, instant messaging servers, and file servers. In one embodiment, the applications 105-107 make calls to a networking application programming interface (API) 208 exposed by the networking stack 102 to access networking resources provided by the networking stack 102.

The networking stack 102 of this embodiment includes queue management logic 115 for managing a plurality of networking queues 110-112 on behalf of each of the applications 105-107. A packet scheduler 116 in the networking stack schedules packets to be transmitted and received from/to each of the queues based on packet classifications (as described in greater detail below). Although illustrated as separate modules in FIG. 1A, it will be appreciated that the queue management logic 115 and scheduler 116 may be implemented as a single integrated software module.

In one embodiment, each of the queues 110-112 managed by the queue management logic 110-112 includes a send queue for storing outgoing network packets (e.g., TCP/IP packets) and a receive queue for storing incoming network packets. The send and receive queues are managed differently for each of the applications 105-107 based on the networking requirements of each of the applications 105-107. For example, different applications may have different packet loss, latency, and flow elasticity requirements, all of which are monitored and managed by the queue management logic 115. In one embodiment, the networking requirements of each application 105-107 are specified ahead of time (e.g., when the application initially registers via the API 108) and the networking packets for that application are managed by the queue management logic 115 based on the specified requirements. By way of example, a Web browsing application is typically more latency-tolerant than a real-time video chat application. Consequently, the Web browsing application will be associated with a different queue having different specified service level than the real-time video chat application.

In one embodiment, each driver 150 installed on the client device includes queue management logic 155 for managing a set of driver queues 151-153, each of which may also be associated with a different service level. In addition, each driver may have its own scheduler 160 for performing packet scheduling at the driver level and its own queue management logic 155 for managing the queues 151-153. As with the networking stack 102, the driver queue management logic 155 and driver scheduler 160 may be implemented as a single logical module (rather than separate modules as illustrated in FIG. 1). In one embodiment, each driver 150 may either choose to manage packet scheduling on its own (referred to herein as "driver managed" scheduling) or may rely on the packet scheduler 116 and queue management logic 115 of the networking stack 102 for packet scheduling/queuing.

By way of example, and not limitation, Ethernet drivers and cellular wireless (e.g., 3G, 4G) drivers may rely on the packet scheduling and queuing provided by the scheduler 116 of the networking stack 102 while 802.11n (Wi-Fi) drivers may use the driver scheduler 160 to manage packet scheduling and queuing. In one embodiment, the Wi-Fi driver implements Wireless Multimedia Extensions (WME) (also known as Wi-Fi Multimedia (WMM) standard), to schedule network traffic according to the four priority levels of voice, video, best effort, and background. However, the underlying principles of the invention are not limited to any particular networking standard.

In one embodiment, the Wi-Fi driver is capable of dynamically switching between driver-managed scheduling and scheduling at the network layer. For example, when on an 802.11n network which supports WME, the driver may choose driver-level scheduling but when on an 802.11b or 802.11g network, the driver may choose scheduling at the network layer. In one embodiment, when utilizing network stack-managed scheduling, the network stack 102 will notify the driver when a packet is ready to be dequeued. The driver will then dequeue and transmit the packet (as described in greater detail below).

As illustrated in FIG. 1A, in contrast to prior implementations in which packets are pushed from the networking stack to the driver and buffered in the driver regardless of network conditions, in one embodiment of the invention, continuous feedback 171 is provided between the driver layer 150 and the networking stack 102. The feedback from the driver 150 to the networking stack ensures that the networking stack 102 is aware of networking conditions of the communication link managed by the driver 150 and may perform packet scheduling/queuing based on this knowledge. In one embodiment, the networking stack 102 implements packet scheduling and queuing intelligently as described herein, based on the detected networking conditions. Similarly, the feedback signal from the networking stack 102 to the driver 150 notifies the driver of the conditions within the transmit/receive queues 112 of the networking stack (e.g., such as when a new packet is ready to be transmitted from a particular queue).

As illustrated in FIG. 1B, scheduling may be employed for at the network stack layer for some communication channels and at the driver layer for others (e.g., some WiFi channels as discussed above). In particular, in the illustrated embodiment, packet scheduling may be performed in the network stack layer 102 for the communication channels to servers 120 and 123, and client 121, whereas driver-managed scheduling may be performed for the communication channel to server 122. In addition, as shown in FIG. 1B, a single application 105 may have different types of data traffic assigned to different queues which support different packet loss, latency, and flow elasticity requirements. For example, a particular application may open a TCP/UDP socket to communicate control data, text, audio, and video, each of which have different requirements with respect to the above variables. As such, one type of data (e.g., control data) may be queued in queue 113 associated with a first service class and a second type of data (e.g., interactive video) may be queued in queue 110 associated with a second service class. Additionally, different applications may queue data in the same queue associated with the same service class. For example, applications 105 and 106 may queue control data in queue 110 associated with a service class for control data and applications 106 and 107 may queue interactive video data in queue 111 associated with a service class for interactive video data.

Additionally, It will be understood that, depending on network connectivity (e.g., whether the client 101 is coupled to Ethernet or Wifi) and other network variables, the client device 101 may utilize only network-layer queue management and/or scheduling or only driver-managed queue management and/or scheduling while still complying with the underlying principles of the invention.

Figure 2A:
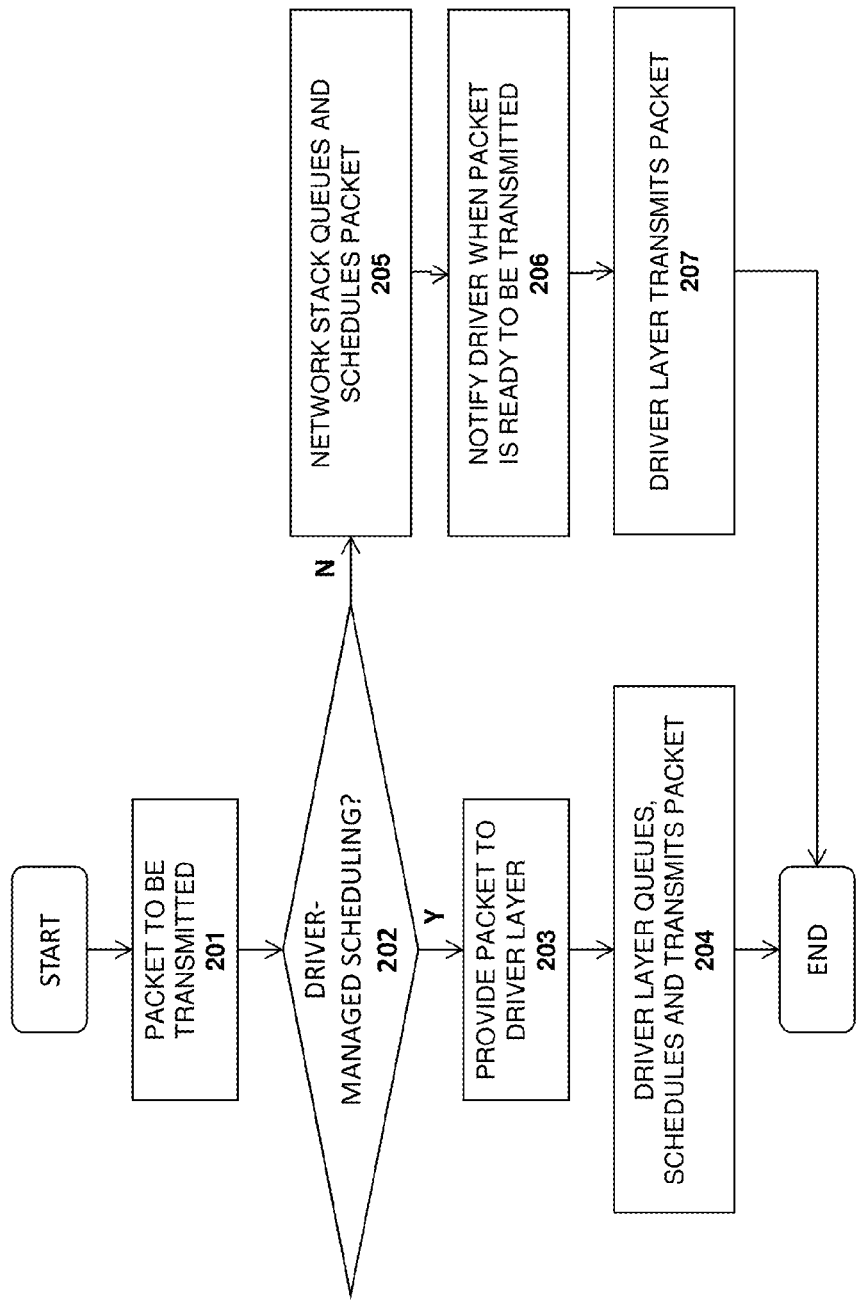
FIG. 2A-B illustrates two methods in accordance with embodiments of the invention.

A method in accordance with one embodiment of the invention is illustrated in FIG. 2A. At 201, a packet to be transmitted is received at the networking layer of a protocol stack on a client device. If the packet is associated with a network link that uses driver-managed scheduling, determined at 202, then at 203 the packet is provided to the driver layer. The driver layer then queues, schedules and transmits the packet at 204. If, however, the packet is associated with a network link that performs packet scheduling at the network layer then, at 205, the network stack queues and schedules the packet for transmission. At 206, the driver is notified when the packet is ready to be transmitted and, at 207, the driver transmits the packet.

The client computing device 101 may be a desktop computer, a notebook or laptop computer, a video game machine, or other consumer electronic device. In some embodiments described herein, the client device 101 is a portable wireless device that may include two-way voice and video, email messaging, and media playback functions. The communication path between the client device 101 and a server, in this example, has a wireless segment between the client device 101 and a wireless base station (e.g., a cell tower or Wifi access point). In the Internet reference model, the networking stack 102 client device 101 communicates with a network access gateway via the base station, in accordance with any suitable wireless communications network access protocol, some examples of which are given below. The other client device 122 may be reached via the combination of another base station and gateway. On top of the network access layer are the internetworking layer (e.g., defining an Internet Protocol, IP, address for each node on the network), the transport layer (e.g., Transport Control Protocol, TCP, performing host-to-host flow control and the opening and closing of connections), and the application layer (e.g., application programs and process protocols such as HTTP, SMTP, and SSH).

Figure 2B:
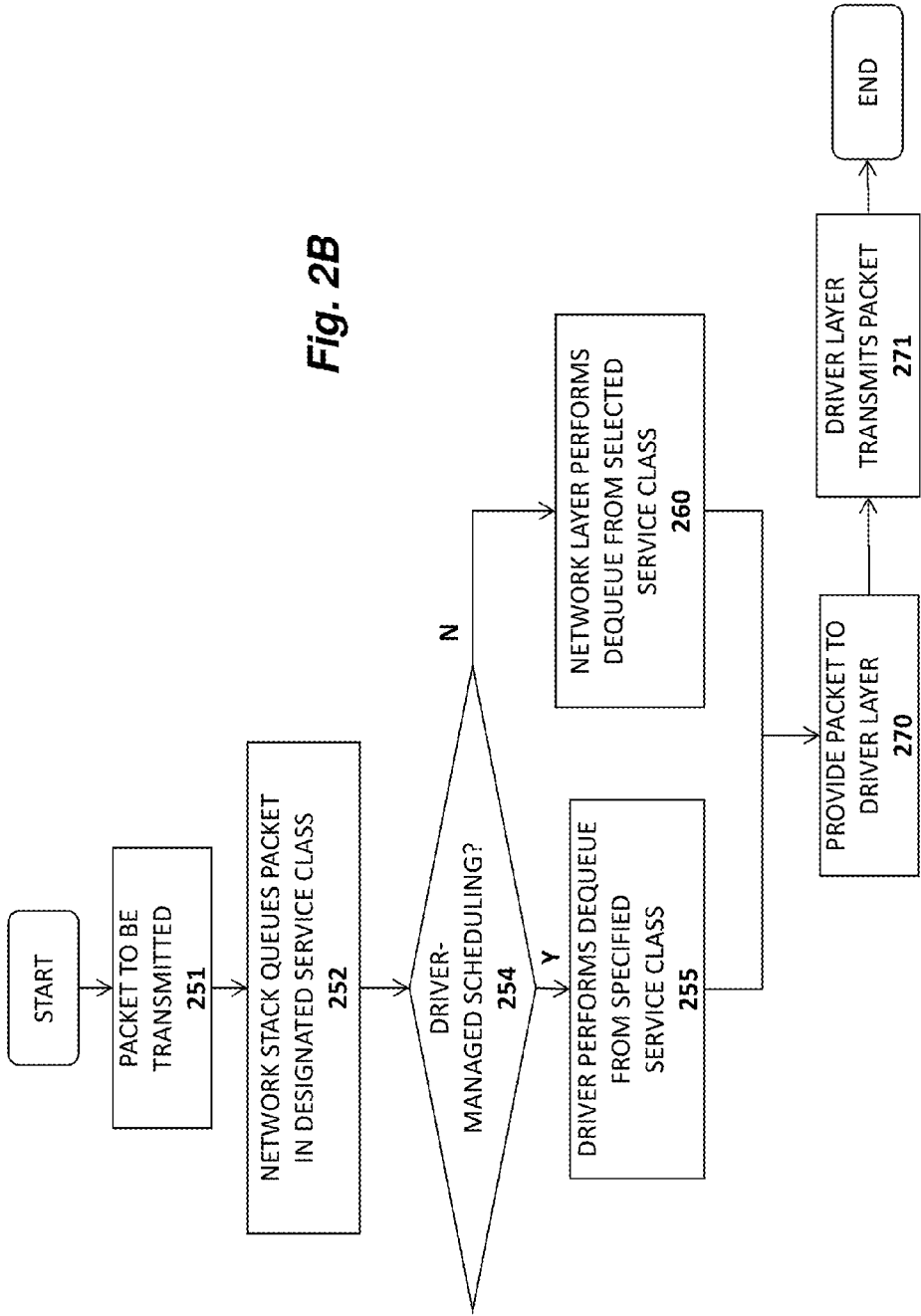

FIG. 2B illustrates an embodiment of the invention in which a packet is transmitted using either driver-managed scheduling or network stack-managed scheduling. At 251 a packet to be transmitted is generated by a particular application over an open socket connection. For example, an interactive video application may generate a video packet to be transmitted to another client. At 252, the network layer queues the packet in a specified service class based on the type of packet. For example, as discussed below, 10 different service classes may be defined to queue data for 10 different types of data traffic. Thus, if the packet is an interactive video packet, it may be queued in a service class queue for interactive video. Similarly, if the packet contains control data, it may be queued in a service class queue for network control.

Figure 6:
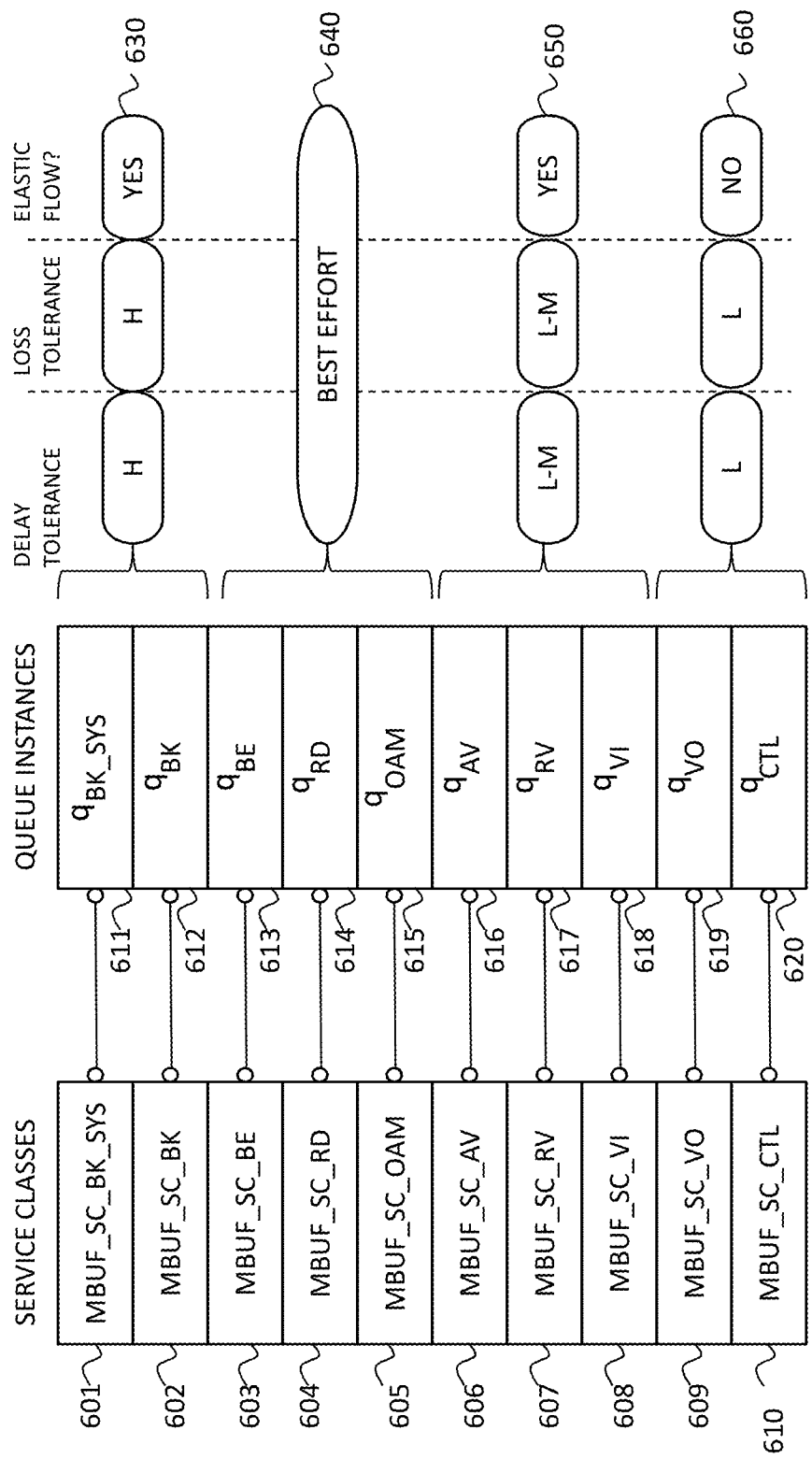
FIG. 6 illustrates one embodiment in which service classes are mapped to queue instances.
Figure 7:
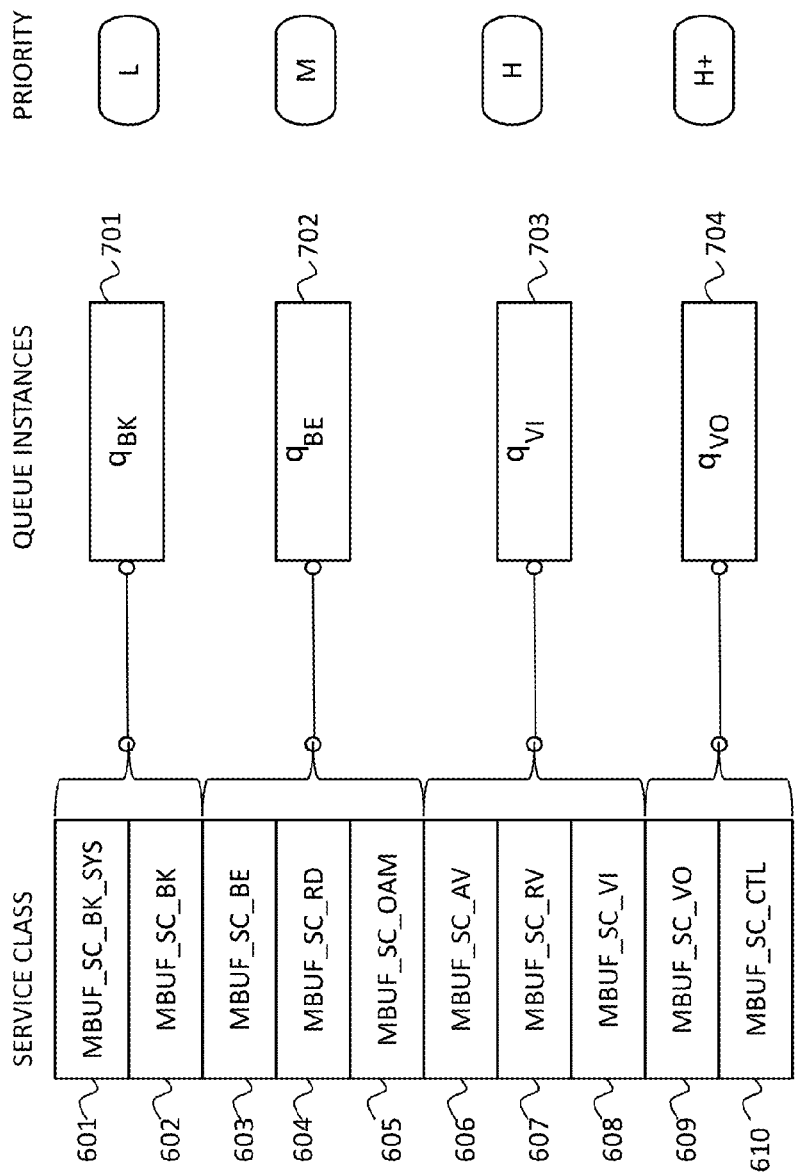
FIG. 7 illustrates another embodiment in which service classes are mapped to queue instances.

Regardless of how the packet is queued, it may be dequeued differently depending on whether the driver- or network stack-managed scheduling. For driver-managed scheduling, determined at 254, the driver performs a dequeue operation from a specified service class at 255. For example, if the driver is implementing 802.11n, then it may choose to perform the scheduling using the four service classes defined by WMM (see, e.g., FIG. 7 illustrating the 10:4 mapping between service classes and queue instances). Alternatively, for other network interface types (e.g., Ethernet, 3G, etc) scheduling may be performed at the network layer (see, e.g., FIG. 6 illustrating a 1:1 mapping between service classes and queue instances). Thus, at 260, the network layer performs the dequeue operation from the selected service class. At 270, the packet is provided to the driver layer which transmits the packet at 271.

Thus, it can be seen from the above that, in one embodiment, when a packet needs to be transmitted, the packet is passed into a network-layer scheduler configured for the network interface. The scheduler extracts the service class from packet; service class determines the queue instance to enqueue the packet on. The packet then gets enqueued onto the corresponding queue instance; the packet may be dropped if queue is full or flow controlling (the decision to drop/enqueue is left to the queueing discipline/algorithm (e.g. SFB) as described below). The driver is notified that there is work to do. At some point, the driver dequeues a packet. The queue instance needs to be identified. If the interface is configured for "network stack scheduling", the scheduler selects eligible queue to be serviced. If the interface is configured for "driver scheduling", the driver indicates to the scheduler the queue to be chosen for service. Once a queue instance is identified, a packet, if available, is dequeued from the queue. The packet is then handed to the driver for transmission over medium which transmits the packet.

As indicated in FIGS. 1A-B, in one embodiment, continuous feedback 172 is provided from the networking stack 102 to each of the applications 105-107 (as indicated by the dotted arrows) and is used to provide flow control for the network flow to/from each of the applications 105-107. For example, when the transmit queue 110-112 for a particular TCP or UDP socket has reached a specified threshold, a feedback signal is generated to instruct the respective application 105-107 to suspend or reduce new packet transmissions.

Figures 3A, 3B:
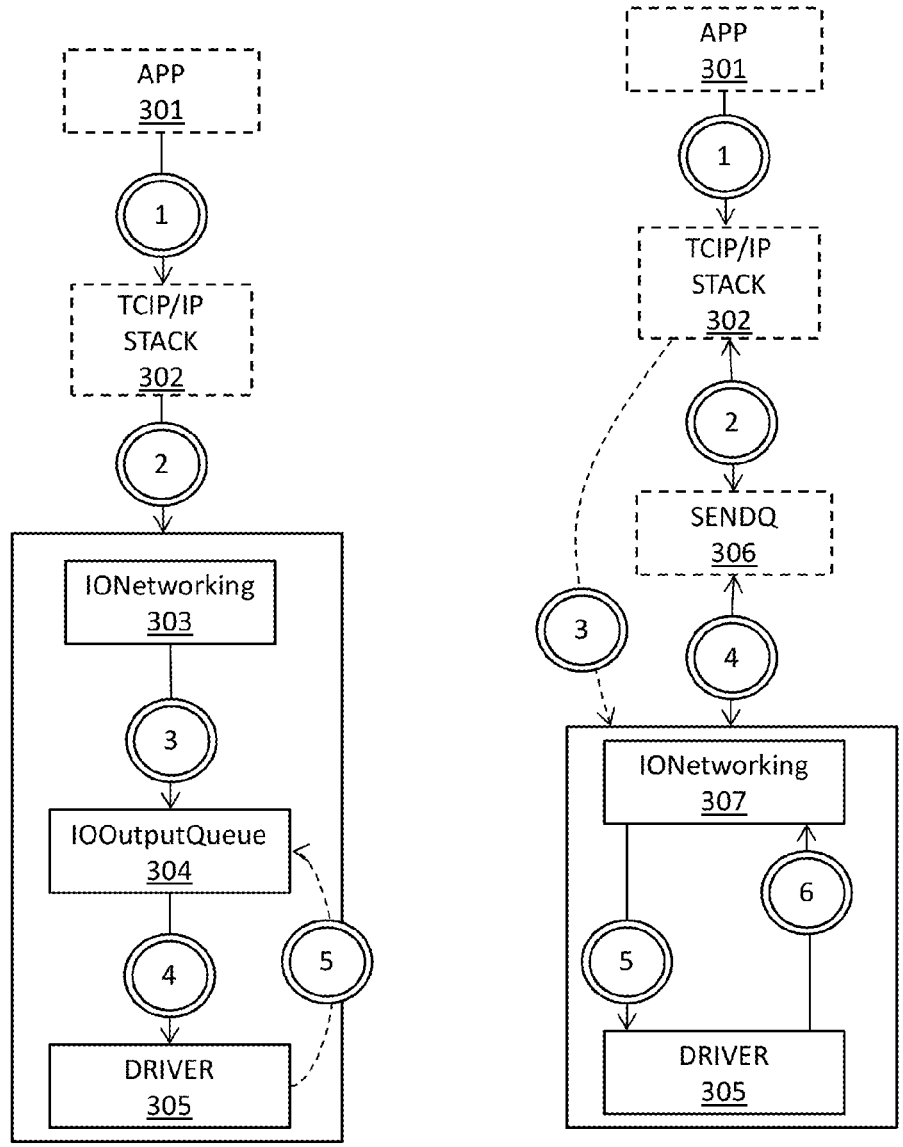
FIGS. 3A-B illustrate communication between a networking stack and a driver for transmitting data packets in accordance with two different embodiments of the invention.

FIGS. 3A-B illustrate different network driver models in accordance with different embodiments of the invention. In FIG. 3A, the application 301 sends packets to be transmitted to the network stack 302 (1) which then sends the network packets to the IO networking interface 303 of the driver (2). In one embodiment, the IO networking interface 303 classifies the packet and places the classified packet in an appropriate IO Output Queue 304 based on the packet classification (3). As mentioned above, for WMM, the classifications may include voice, video, best effort, and background. The driver 305 then uses its own packet scheduler to dequeue the packet from the appropriate IP output queue 304 (4, 5).

In the network stack-managed model illustrated in FIG. 3B, the application 301 sends packets to be transmitted to the network stack 302 (1) which then classifies the packet (using the classification schemes described below), and places the classified packet in an appropriate send queue 306 (2). In one embodiment, there are as many different send queues 306 as there are packet classifications (e.g., 10 different send queues for 10 different packet classifications). The networking stack 302 notifies the driver layer (3) when a new packet is ready for transmission in one of the queues. The IO networking interface of the driver 307 then dequeues the packet and passes the dequeued packet to the driver 305 for transmission (5, 6).

Figure 3C:
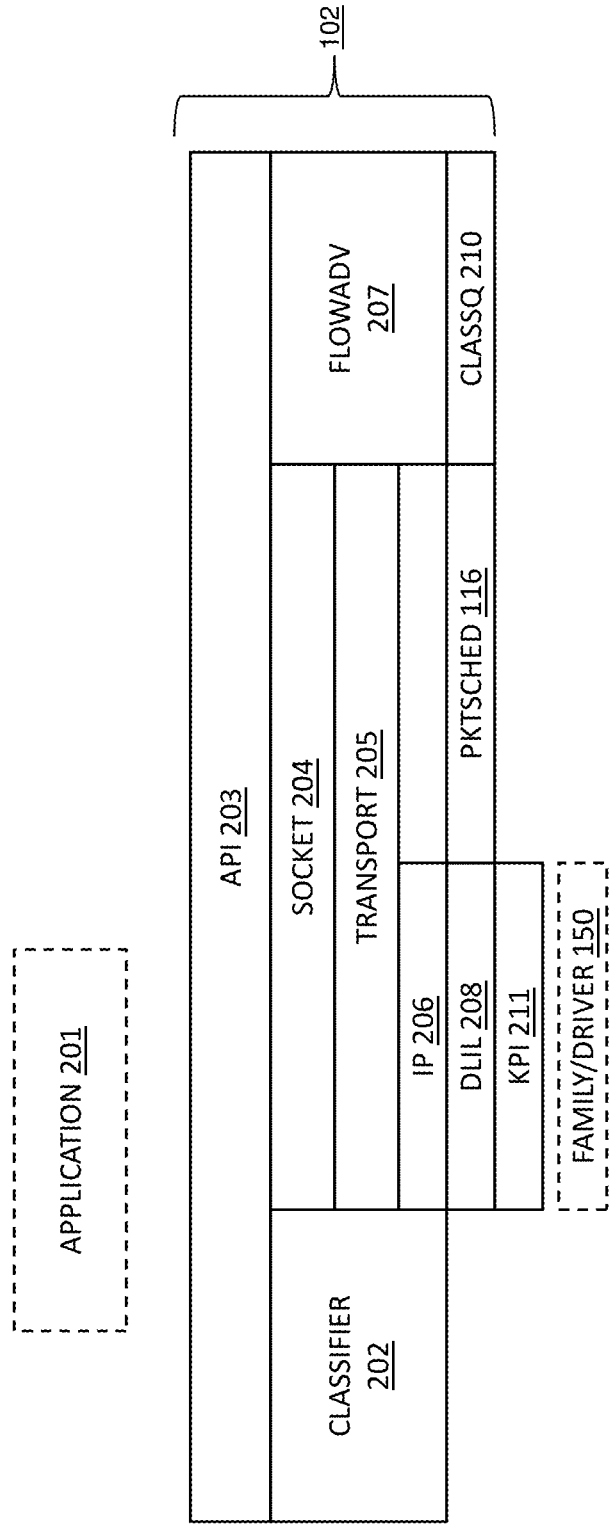
FIG. 3C illustrates a client-side software architecture according to one embodiment of the invention.

FIG. 3C illustrates additional architectural details of the networking layer 102 including a packet classifier 202 for classifying packets, an API 203 for interfacing with applications 201, an Internet Packet layer 206, transport layer 205 (e.g., TCP, UDP), and socket layer 204, a packet scheduler 209 for scheduling packet transmission, a plurality of class queues 210, a flow advisory module 207, and a kernel programming interface (KPI) 211. Each of these components is described in greater detail below.

A. Kernel Programming Interface

In one embodiment, the following set of private KPIs are employed:

ifnet_allocate_extended( )

Allocate an ifnet instance which supports the new output model. This is an extended (private) version of the public ifnet_allocate( ) KPI, which requires the newly-defined ifnet_init_eparams structure to be filled by the caller. This structure is analogous to the ifnet_init_params, with several new fields that are related to the new output model:

| ifnet_init_eparams fields | Descriptions |
| --- | --- |
| pre_enqueue( ) | If defined, this callback is invoked for each outgoing packet for the interface. The driver may perform last-minute changes on the (fully-formed) packet, but it is responsible for calling ifnet_enqueue( ) to enqueue the packet upon completion. (Some drivers will not need to register this callback, but it is provided just in case.) |
| start( ) | This callback is used to indicate to the driver that one or more packets may be dequeued by calling ifnet_dequeue( ) or ifnet_dequeue_multi( ). This routine gets invoked when ifnet_start( ) is called; it will be executed within the context of a dedicated kernel thread, hence it is guaranteed to be single threaded. The driver must employ additional serializations if this callback routine is to be called directly from another context, in order to prevent race condition related issues. |
| output_sched_model | This informs the networking stack about the packet scheduling requirements of the driver. By default, the networking stack will choose a scheduler and the scheduling policy for the interface. That means when the driver dequeues a packet, the dequeuing decision is controlled by the scheduler; this is the "normal" scheduling model. Alternatively, the driver may choose to perform its own scheduling. In this "driver managed" scheduling model, the network stack simply provides the queue instances, and the driver is then required to specify the queue from which the packet is to be dequeued from. A use case example of the latter model is an 802.11 driver which incorporates Wi-Fi Multimedia (WMM); the hardware in conjunction with the access point perform the packet scheduling. |
| sndq_maxlen | The maximum size of the output queue; this is more or less a hint from the driver about the size of its transmit queue. When set to 0, the network stack will attempt to pick a reasonable size (currently set to 128 packets.) |
| output_ctl( ) | For future use, to provide for a way for the networking stack to inform the underlying driver/family about changes on the output parameters (e.g. hardware offload, transmit ring size, etc.). |
| {input_bw, input_bw_max} | The effective and theoretical input/downlink link rates; for informational purposes. |
| {output_bw, output_bw_max} | The effective and theoretical output/uplink link rates. | ifnet_enqueue( )

Enqueue a packet to the output queue of an interface which implements the new driver output model. This is provided for a driver/family which implements a pre_enqueue( ) callback.

{ifnet_dequeue, ifnet_dequeue_multi}( )

Dequeue one or more packets from the output queue of an interface which implements the new driver output model, and that the scheduling model is set to "normal."

{ifnet_dequeue_service_class, ifnet_dequeue_service_class_multi}( )

Dequeue one or more packets from the output queue of an interface which implements the new driver output model, and that the scheduling model is set to "driver managed."

ifnet_set_output_sched_model( )

Set the scheduling model to "normal" or "driver managed."

{ifnet_set_sndq_maxlen, ifnet_get_sndq_maxlen}( )

Set and get the maximum length of the output queue.

ifnet_get_sndq_len( )

Get the current length of the output queue.

ifnet_start( )

Trigger the transmission at the driver layer on an interface which implements the new driver output model. This may result in the driver's start( ) callback to be invoked, if not already.

{ifnet_set_bandwidths, ifnet_bandwidths}( )

Set and get the uplink and downlink link rates of the interface. The rates may be set by the driver at anytime after the ifnet is attached, whenever the information is available at its layer.

{ifnet_transmit_burst_start, ifnet_transmit_burst_end}( )

Alternative mechanisms to estimate the uplink link rate, when the driver is not able to easily retrieve such information from the hardware. These inform the networking stack about the beginning and end of transmission of a burst.

In one embodiment, a driver that has registered itself as supporting the new output model (i.e., the network stack managed scheduling) is flagged with the IFEF_TXSTART flag.

B. Data Link Interface Layer (DLIL) 208

Figure 4:
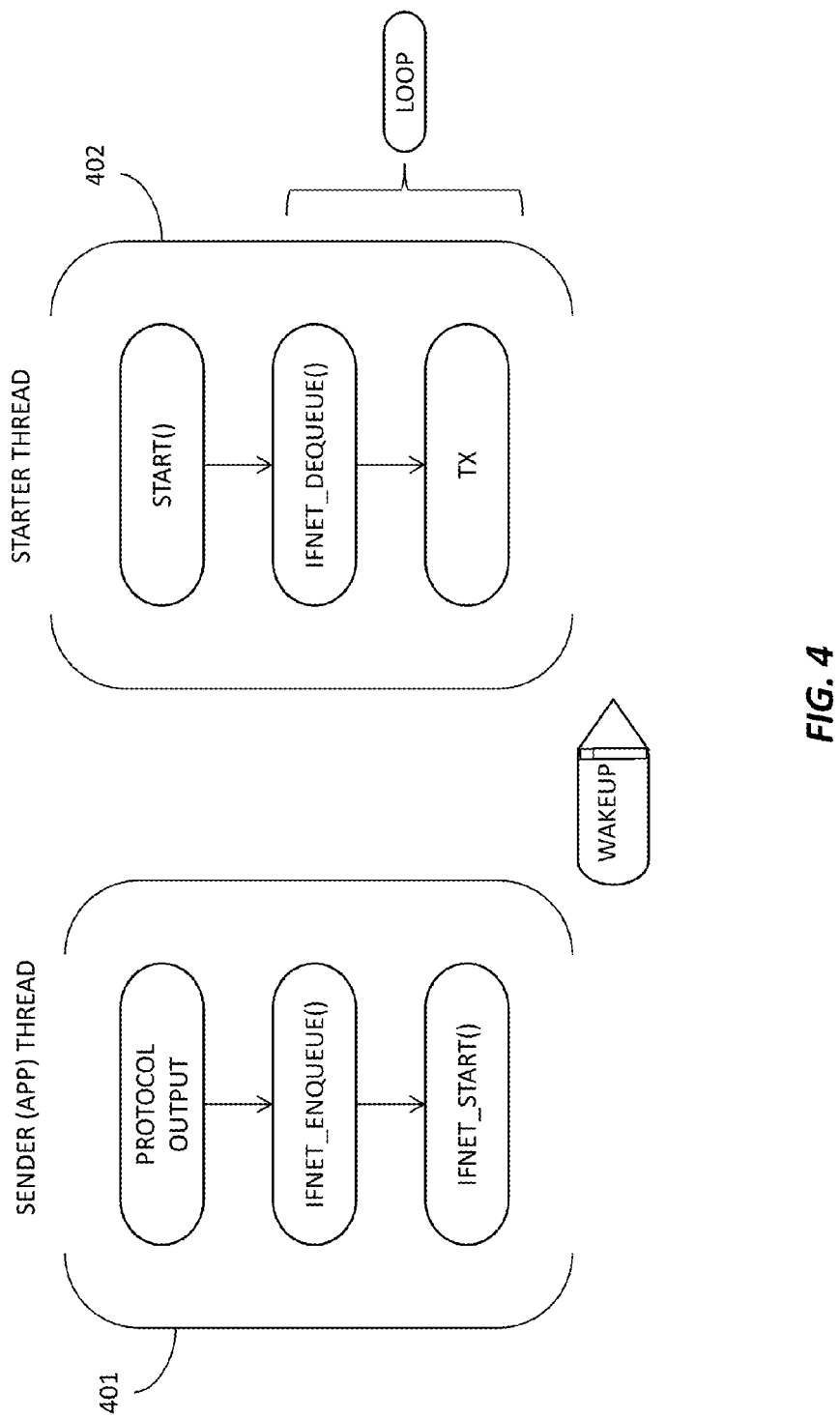
FIG. 4 illustrates an exemplary sender thread and an exemplary starter thread.

Starter Thread 402 (one embodiment illustrated in FIG. 4)

An interface which supports the new output model (i.e., network layer scheduling) uses a dedicated kernel thread, the "starter thread" 402, whose job is to invoke the driver's start( ) callback. In one embodiment, this thread is signaled to run, if not already, whenever ifnet_start( ) is called, as part of enqueuing a packet via ifnet_enqueue( ), allowing the application thread to return immediately upon enqueuing the packet to the output queue. It provides a form of serialization for the driver's start( ) callback, so that the dequeue can happen in-order. It also reduces complexity at the driver layer, as the driver may perform certain operations (hardware-related or not) that may momentarily block the execution of the thread without worrying too much about the impact, as no lock is held by the networking stack when it executes the driver's start( ) callback from the context of this starter thread.

Token Bucket Regulator

Additionally, the network layer managed output model allows for a form of uplink rate limiting at the ifnet layer, when a Token Bucket Regulator (TBR) is configured for the interface. By default, an interface does not have a TBR configured; enabling TBR requires manual configuration via ifconfig(8) or pfctl(8). When TBR is enabled, the starter thread will periodically wakeup (every 10 ms) whenever the output queue is non-empty as illustrated at 402 in FIG. 4. During each period, the driver is allowed to dequeue as many bytes as there are available tokens; the tokens get refilled at the beginning of each period. The number of tokens are computed according to the rate for which the TBR is configured for. One particular TBR implementation does not require callouts to be allocated (unlike the approach taken by BSD); because of this, it can accommodate extremely high rates (tens of Gbps) with very low CPU overhead, as the interval is fixed and thus independent of the callout resolution (10 ms is achievable across different platforms.)

Figure 5:
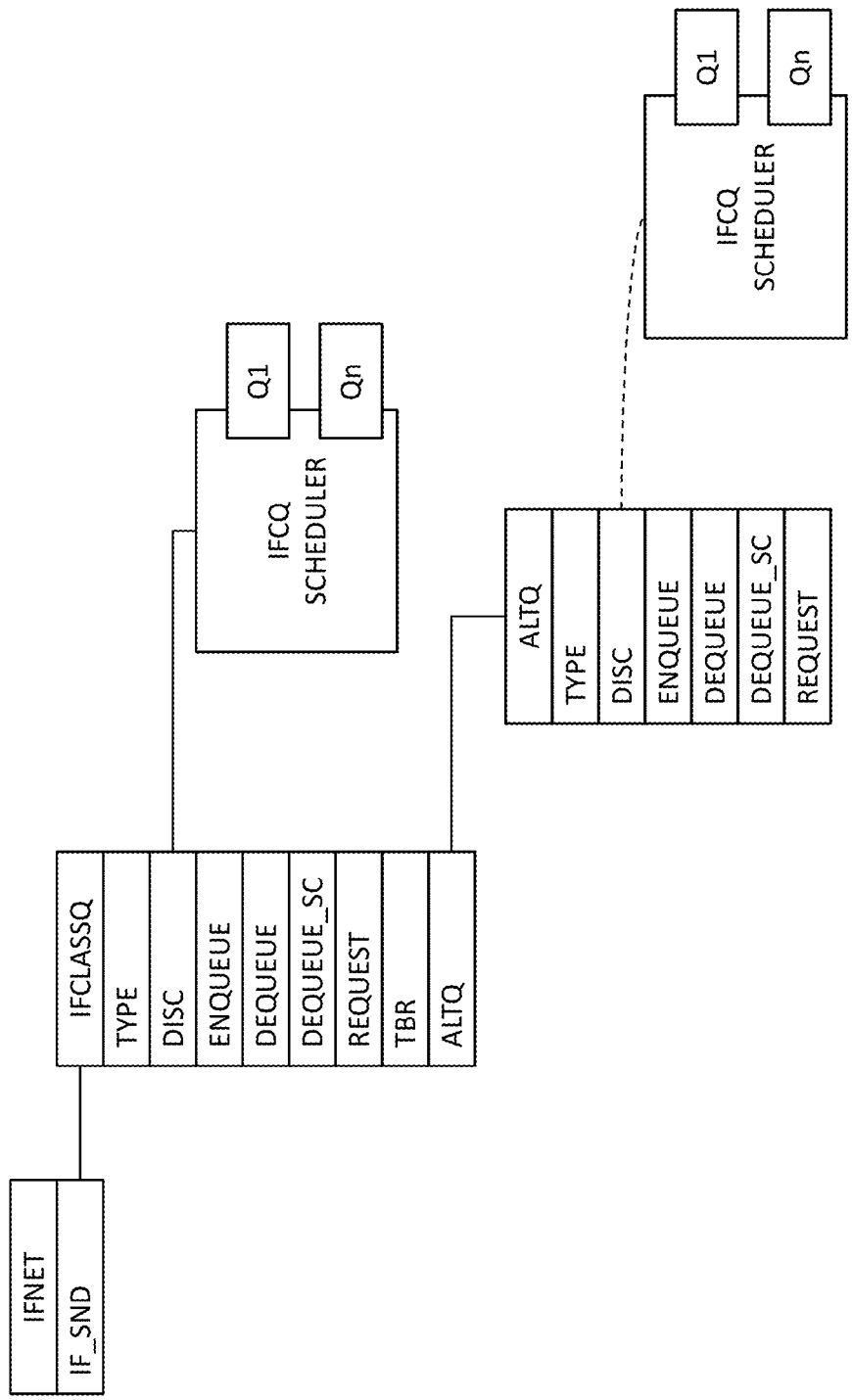
FIG. 5 illustrates an exemplary class queue instance and scheduler.

Transmit Queues (one embodiment illustrated in FIG. 5)

The if_snd member of ifnet holds the transmit queues for the interface. This data structure contains information about the built-in scheduler (type, instance, callbacks), TBR, and optionally, an alternative scheduler.

By default, in one embodiment, the system creates a built-in instance of packet scheduler (ifcq instance). As mentioned, the choice of a packet scheduler and its parameters depends on the type of the network interface and in some instance the topology of the network as well. In one embodiment, when a packet scheduler is attached, it stores its instance in ifcq_disc, and configures the enqueue( ), dequeue( ) and request( ) callbacks to the scheduler's corresponding routines. For interfaces which requires a "driver managed" model, a special scheduler is attached, which provides an alternative dequeue_sc( ) instead of a dequeue( ) callback. Certain embodiments of these callbacks are as follows:

| Scheduler functions | Descriptions |
| --- | --- |
| ifclassq_enq_func( ) | Enqueues a single packet to the scheduler. The possible return types are: CLASSQEQ_SUCCESS when the packet is successfully enqueued; CLASSQEQ_SUCCESS_FC when the packet is successfully enqueued on a queue that is asserting flow control; CLASSQEQ_DROPPED when the packet is dropped; CLASSQEQ_DROPPED_FC when the packet is dropped because the queue exceeds its flow control limit; and CLASSQEQ_DROPPED_SP when the packet is dropped because the queue is suspended. |
| ifclassq_deq_func( ) | Dequeues a single packet from the scheduler; this is whatever packet the scheduler determines to be most eligible for transmission. The dequeue opcode can either be CLASSQDQ_REMOVE for normal dequeue, or CLASSQDQ_POLL for retrieving the eligible packet without actually dequeuing it. |
| ifclassq_deq_sc_func( ) | Similar to to the regular dequeue callback, except that the caller determines the service class of the packet that is eligible for transmission. |
| ifclassq_req_func( ) | A request callback to the scheduler. The last parameter depends on the type of request made. The types are: CLASSQRQ_PURGE for purging all queues in the scheduler; CLASSQRQ_PURGE_SC for either purging a specific queue, or optionally a flow from within that queue; CLASSQRQ_EVENT for propagating interface events (changes in speed, MTU, link state); and CLASSQRQ_THROTTLE for applying throttling parameters for the queue. |

One embodiment of the scheduler 116 instantiates N number of classes; each class correlates to a service class and manages a queue instance 110-112. Packets are enqueued in one of these queue instances, depending on how they are classified. When PF_ALTQ support is configured, the built-in scheduler and its parameters may be overridden via the Packet Filter (PF) infrastructure (e.g. by way of pfctl(8)). This provides for a convenient way for different characteristics of the packet scheduling to be modeled (e.g. trying out different schedulers and/or parameters).

Packet Scheduler 116

One embodiment of the packet scheduler module 116 provides entry points for enqueuing and dequeuing packets, to and from one of its class queue instances 210. In one embodiment, each class corresponds to a queue. It manages all of its queues depending upon the scheduling algorithm and parameters.

In one embodiment, a scheduler 116 gets configured and attached to an ifnet through one of the following techniques:

1. Built-In (Static):

When an interface is attached to the networking stack, a scheduler is chosen based upon the queue scheduling model that is requested by the driver. For a "normal" model, the stack creates a scheduler with 10 classes (hence queues). For a "driver managed" model, an instance of a special scheduler with 4 classes is created instead.

2. PF (Dynamic):

In one embodiment, the built-in (static) configuration may be overridden by configuring the scheduler and its parameters via the PF framework. This requires the PF_ALTQ configuration option to be enabled, and "altq=1" boot-args NVRAM option to be present. In one embodiment, it is not enabled/allowed by default. However, when enabled, it allows for a convenient and expedient mechanism for experimenting with different schedulers and parameters.

In one embodiment, the following schedulers are not used by default and are available only in PF:

| Scheduling Algorithms | Descriptions |
| --- | --- |
| PRIQ | Priority Queuing. This is a non-hierarchical scheduler. It does not require any knowledge of the uplink bandwidth. This scheduler came as part of the original ALTQ code. |
| FAIRQ | Fair Queuing. This is a non-hierarchical scheduler and is an extension of PRIQ with added fairness. It requires knowing the uplink bandwidth, and each priority queue must be assigned with a bandwidth. |
| CBQ | Class-Based Queuing. This is a hierarchical scheduler. It requires knowing the uplink bandwidth. |
| HFSC | Hierarchical Fair Service Curve. This is a hierarchical scheduler. It requires knowing the uplink bandwidth, and it is also rather complex though unique, as it simultaneously supports real-time, link-sharing and rate-limiting services. It allows for each queue to be configured with guaranteed delay characteristics as part of the real-time service. This scheduler came as part of the original ALTQ code. |

In one embodiment, the following schedulers are used by default (i.e., at the networking stack layer 102):

| Scheduling Algorithms | Descriptions |
| --- | --- |
| QFQ | Quick Fair Queuing. This is a non-hierarchical scheduler. It does not require any knowledge of the uplink bandwidth, and is extremely simple to configure. It is also the most efficient scheduler amongst those which provide fairness and bandwidth distribution guarantees. This scheduler can also be configured via packet filter (PF). In one embodiment, QFQ is used for network layer managed scheduling. One embodiment of the QFQ algorithm is described in the document entitled QFQ: Efficient Packet Scheduling With Tight Bandwidth Distribution Guarantees, attached as Appendix A to this patent application. |
| TCQ | Traffic Class Queuing. This is a non-hierarchical, passive scheduler. It does not employ any scheduling algorithm, and simply provides mapping between service classes and groups. This scheduler relies on the driver or hardware to perform the actual packet scheduling (i.e., driver managed scheduling), as the driver is |

| Scheduling Algorithms | Descriptions |
| --- | --- |
| | responsible for choosing the service class that is eligible for transmission. |

Mapping 1. 1:1 Mapping

As illustrated in FIG. 6, the QFQ configuration used in one embodiment for network layer-managed scheduling provides a 1:1 mapping between packet service classes 601-610 and packet queue instances 611-621, respectively. As illustrated, the 10 service levels are roughly divided into 4 groups 630, 640, 650, 660, and prioritization is provided within each group. The groups are defined based upon the characteristics of the classified traffics, in terms of the delay tolerance (low-high), loss tolerance (low-high), elastic vs. inelastic flow, as well as other factors such as packet size and rate. As described herein, an "elastic" flow is one which requires a relatively fixed bandwidth whereas an "inelastic" flow is one for which a non-fixed bandwith is acceptable. The illustrated 1:1 mapping allows for the networking stack to achieve full control over the behavior and differentiation of each service class: a packet is enqueued directly into one of the queues according to how it was classified; during dequeue, the scheduler determines the packet that is to be transmitted from the most eligible queue.

2. 10:4 Mapping

As illustrated in FIG. 7, the TCQ configuration used for driver-managed scheduling in one embodiment provides a 10:4 mapping between 10 service classes 601-610 and 4 queue instances 701-704. This scheduler is passive, in the sense that it does not perform any kind of packet scheduling, but instead simply provides the queue instances and maps the service classes to the queues. Because the networking stack of this embodiment has no control over the scheduling, the queues cannot be defined with similar characteristics as those for the 1:1 mapping. Instead, the could be perceived as having priorities ranging from low (L) to highest (H+). A packet is enqueued into directly into one of the queues which represents the service class that it was originally classified with. During dequeue, the driver is responsible for choosing the most eligible service class for transmission. The number of queues is set to 4 and is an implementation artifact; as mentioned this also happens to be the number of 802.11 WMM access categories.

Queuing Disciplines

In one embodiment, a queuing discipline or algorithm module manages a single instance of a class queue; a queue simply consists of one or more packets (mbufs). The algorithm is responsible for determining whether or not a packet should be enqueued or dropped.

In one embodiment, a queuing algorithm gets configured and attached to an instance of a scheduler class through one of the following ways:

1. Built-in (Network Stack-Managed):

When a scheduler class gets instantiated as part of configuring a packet scheduler on an ifnet, a queuing algorithm is chosen. All classes of the scheduler share the same queue algorithm (each with its own unique instance.)

2. PF (Dynamic, or Driver-Managed):

Alternatively, the built-in (static) configuration may be overridden by configuring the scheduler and its parameters—including the queuing algorithms for the classes via the packet filter (PF) framework.

Algorithms

In one embodiment, the following queuing algorithms are not used by default, and are available only via PF:

| Queuing Algorithms | Descriptions |
| --- | --- |
| DROP-TAIL | Basic FIFO with tail-drop. |
| RED | Random Early Drop. This came from ALTQ. |
| RIO | RED with IN/OUT bit. This came from ALTQ. |
| BLUE | BLUE maintains a drop/mark probability. When a queue exceeds its allocation, the probability is increased. When a queue is empty, the probability is decreased. Packets are dropped/marked when the probability reaches a certain limit. Unlike RED, this algorithm requires little or no tuning; however, it is not capable of tracking multiple flows. |
| SFB | Stochastic Fair BLUE, essentially a fair variant of BLUE which hashes flows and maintains different mark/drop probability for each flow, based on whether a flow exceeds its allocation or is idle. The SFB algorithm employed in one embodiment is described in the document attached as Appendix B to this patent application entitled Stochastic Fair Blue: A Queue Management Algorithm for Enforcing Fairness. SFB also provides an additional rate-limiting functionality for inelastic flows. The ability of SFB to track multiple flows is important for the Flow Advisory mechanism (as well as those derived from it.) This is an original implementation/interpretation of the SFB algorithm designed by the assignee of the present patent application. |

Packet Classification

As mentioned, in one embodiment, each outbound packet is enqueued in a class queue instance that corresponds to the packet's service class. The service class assignment, or packet classification, occurs in several places throughout the networking stack. In general, packet classification can be explicit (opted-in by the application) or implicit (set or overridden by the system).

Figure 8:
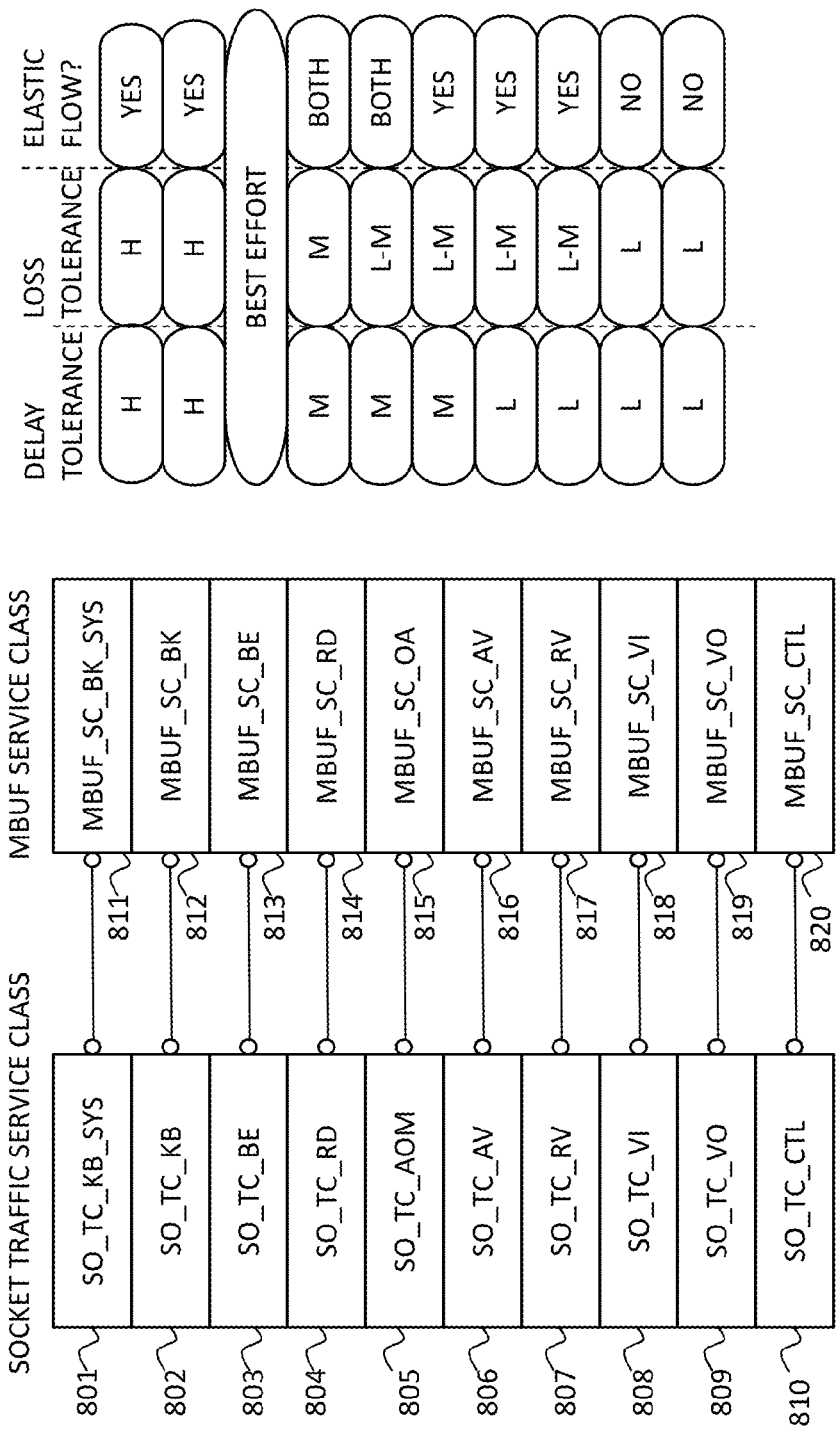
FIG. 8 illustrates an embodiment in which socket traffic classes are mapped to service classes.

Explicit Classification:

In one embodiment, an application may classify its traffics by issuing the SO_TRAFFIC_CLASS option—either sticky via setsockopt(2) or on a per-message basis with sendmsg (2)—using one of the following traffic service class values, which are illustrated mapped to service classes in FIG. 8:

| Traffic Service Classes | Descriptions |
| --- | --- |
| SO_TC_BK_SYS | "Background System-Initiated", high delay tolerant, high loss tolerant, elastic flow, variable size & long-lived. E.g., system initiated iCloud ™ synching or Time Capsule backup, for which there is no progress feedbacks. |
| SO_TC_BK | "Background", user-initiated, high delay tolerant, high loss tolerant, elastic flow, variable size. E.g., user-initiated iCloud synching or Time Capsule backup; or traffics of background applications, for which there is some progress feedback. |

-continued

| Traffic Service Classes | Descriptions |
| --- | --- |
| SO_TC_BE | "Best Effort", unclassified/standard. In one embodiment, this is the default service class. |
| SO_TC_RD | "Responsive Data", a notch higher than "Best Effort", medium delay tolerant, elastic & inelastic flow, bursty, long-lived. E.g., email, instant messaging, for which there is a sense of interactivity and urgency (user waiting for output). |
| SO_TC_OAM | "Operations, Administration, and Management", medium delay tolerant, low-medium loss tolerant, elastic & inelastic flows, variable size. E.g., Virtual Private Network (VPN) tunnels. |
| SO_TC_AV | "Multimedia Audio/Video Streaming", medium delay tolerant, low-medium loss tolerant, elastic flow, constant packet interval, variable rate & size. E.g., AirPlay ™ playback (both video and audio). |
| SO_TC_RV | "Responsive Multimedia Audio/Video", low delay tolerant, low-medium loss tolerant, elastic flow, variable packet interval, rate and size. E.g., AirPlay mirroring, screen sharing. |
| SO_TC_VI | "Interactive Video", low delay tolerant, low-medium loss tolerant, elastic flow, constant packet interval, variable rate and size. E.g., FaceTime ™ video. |
| SO_TC_VO | "Interactive Voice", low delay tolerant, low loss tolerant, inelastic flow, constant packet rate, somewhat fixed size. E.g., VoIP including FaceTime ™ audio. |
| SO_TC_CTL | "Network Control", low delay tolerant, low loss tolerant, inelastic flow, rate is bursty but short, variable size. E.g., Domain Name Service (DNS) queries; certain types of locally-originated Internet Control Message Protocol (ICMP), ICMPv6; Internet Group Management Protocol (IGMP)/ Multicast Listener Discovery (MLD) join/leave, Address Resolution Protocol (ARP). TCP/UDP acknowledgement (ACK). |

Thus, it can be seen from the above that, in one embodiment, the system assigns network control packets to the highest priority classification, thereby ensuring that control packets are forwarded ahead of packets having all lesser classifications. This is an improvement over prior systems in which certain control packets (e.g., such as TCP acknowledgement (ACK) packets could become stuck in a queue behind other types of non-control packets (thereby reducing system performance).

In one embodiment, any packets classified as background system initiated (SO_TC_BK_SYS) will be suspended in queues while a voice call is occurring on the client device. As such, this embodiment provides significant benefits over prior systems in which a voice call could be degraded or dropped as the result of low priority packets (e.g., background system-initiated packets) being transmitted. Thus, in this embodiment, a user's photo stream or other data to be backed up to a service (e.g., such as iCloud) will not interfere with voice calls.

One embodiment of the system can prevent traffic marked as background system-initiated so that they do not interfere with an incoming phone call, there by increasing the reliability of the call. When a phone call is initiated, the network layer (e.g., TCP/IP layer) will receive a flow control notification to suspend all background system-initiated traffic. In response, the network layer may stop sending down any more packets to the interface. It may also stop the application from writing any more data down the network stack. This will help to improve CPU utilization because the application is quiesced and it also improves reliability of voice calls. If the voice call completes in a reasonable duration of time, the applications can resume data communication.

In one embodiment, when a particular lower priority application is suspended, the network stack 102 will (periodically) probe the communication link (e.g., via feedback signal 171) to determine when it may resume transmission, and will communicate this information to the respective application. When the link is no longer loaded, packet transmission will then resume.

In summary, the continuous flow control feedback 171 between the driver layer 150 and the networking stack 102, and the feedback 172 between the networking stack and the applications 105-107 provides for a more intelligent, efficient allocation of network channels and bandwidth.

In one embodiment, the above values do not imply guarantees, but are rather hints from the application to the system about the characteristics of its traffic. The system will do its best in providing some form of differentiations on the traffics based on their classifications, but no guarantee is made due to the varying factors ranging from packet scheduling parameters to network topology or media conditions.

In one embodiment, traffic generated by a socket associated with one of the above values will carry the corresponding service class value in the queue/buffer (mbuf); there is a 1:1 mapping between SO_TC and MBUF_SC values, as illustrated in FIG. 8.

Figure 9A:
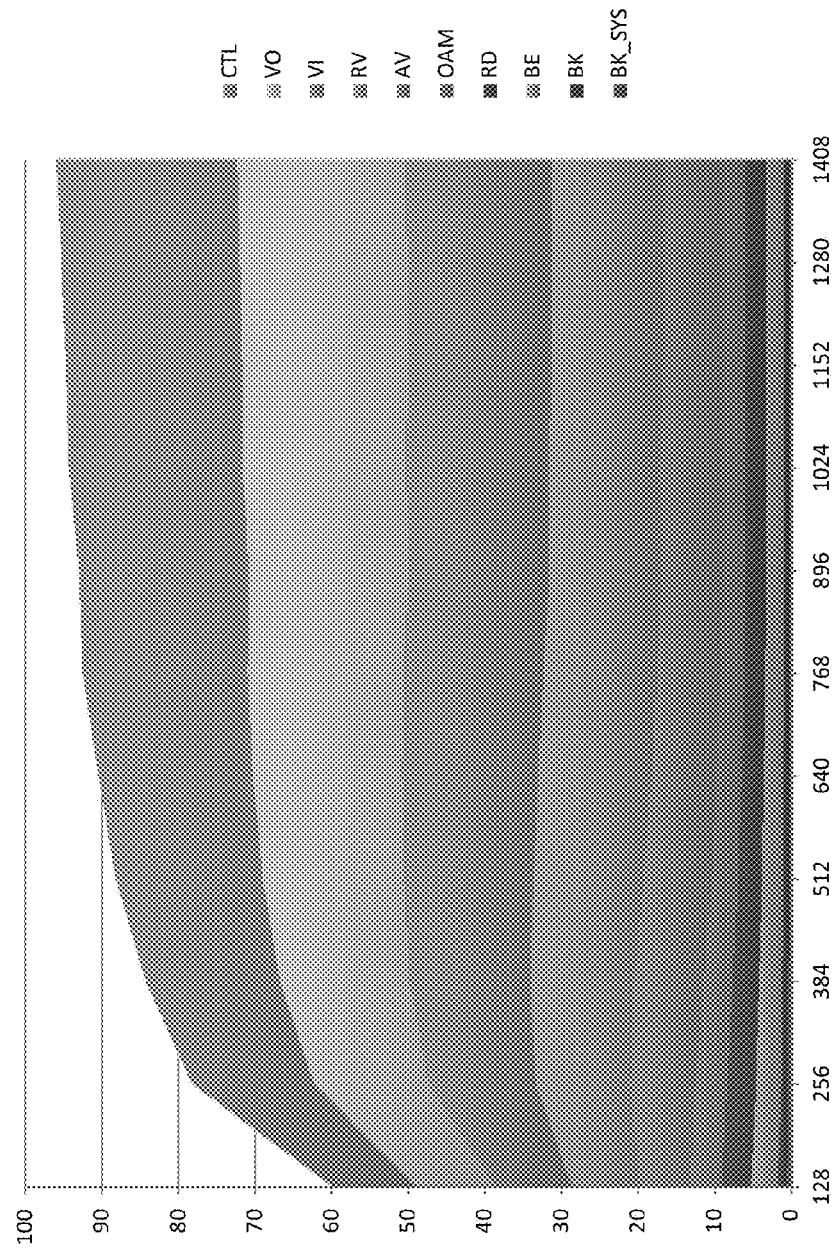
FIG. 9A illustrates a worst-case scenario of link-share distribution in one embodiment with the built-in QFQ scheduler configuration.

FIG. 9A illustrates a worst-case scenario of link-share distribution in one embodiment with the built-in QFQ scheduler configuration. In addition to the socket-level classification, some places throughout the kernel use the MBUF_SC_CTL service class to classify certain control-type packets, (e.g., ARP, ND NS/NA, IGMP/MLD). This also includes temporary elevation of service classes used by TCP ACKs.

Implicit Classification:

This form of classification is possible via the packet filter (PF) framework. It allows for the classification rules to be installed via PF, and take effect for all IP traffics regardless of how they were originally classified at the origin. PF and pfctl(8) have been enhanced with service class-related keywords; FIG. 9B illustrates an example of a PF configuration file that can be processed by pfctl(8) to override the built-in settings.

Thus, in the explicit classification case, an application opens a socket with the default service class (BE). The application may set the service class of the socket via the SO_TRAFFIC_CLASS socket option, so that all future send/write operations will automatically cause packets to be marked with the corresponding service class. The application may choose to selectively associate each datagram sent down the socket with a SO_TRAFFIC_CLASS ancillary message option, so that the associated packet will be marked with the corresponding service class (but will not affect other current or future packets.) In this case, we can easily have many different service classes associated with this socket.

In the implicit classification case, classification rules are installed in the packet filter engine. Each rule contains a signature (e.g. protocol, ports, etc) which upon a match, would result in the packet to be marked with a service class.

Classification Tags.

In addition to marking the queue/buffer (mbuf) with a MBUF_SC value, in one embodiment, the module performing packet classification 202 also associates one or more tags with the packet, in order to assist the rest of the system in identifying the type or flow of the packet. In one embodiment, these tags reside within the built-in pf_mtag sub-structure of the mbuf, and are set regardless of how the classification is performed (explicit or implicit). The tags employed in one embodiment are as follows:

| Tags | Descriptions |
| --- | --- |
| PF_TAG_FLOWHASH | A flow hash has been computed and associated with the mbuf. |
| PF_TAG_FLOWADV | The packet belongs to a locally-terminated flow which is flow advisory capable. |
| PF_TAG_TCP | The outermost packet uses TCP as transport. |

Flow Feedback

Figure 10A:
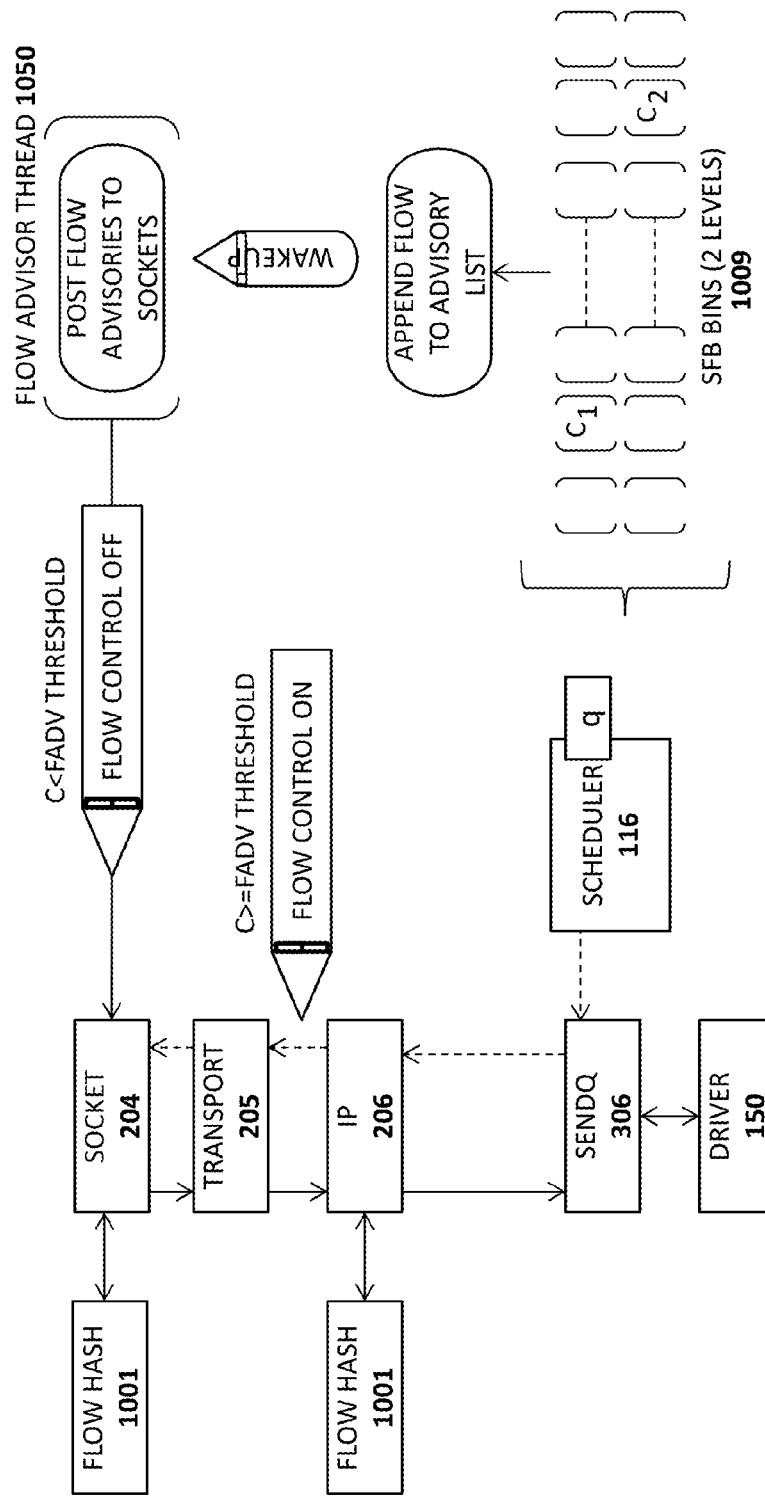
FIG. 10A illustrates flow control using a flow hash in accordance with one embodiment.

Flow Hash:

As illustrated in FIG. 10A, in one embodiment, each mbuf that is being sent out through an interface is tagged with a flow hash 1001 (hence marked with PF_TAG_FLOWHASH) which will help to identify all the packets that belong to a particular flow at the interface layer. In one embodiment, a flow hash 1001 is a 32-bit integer, and it is calculated in one of the following places:

1. Socket 204.

In one embodiment, when a socket is connected, the flow hash for the socket 204 is computed and stored. Further transmissions on this socket will cause the hash value to be carried within the mbuf structure of the packets.

2. Packet Filter (PF).

In one embodiment, when a packet enters the driver 150, a flow hash will be computed and stored in the associated PF rule and states, unless it is already classified. If the packet is passed back to IP 206 successfully, it will carry with it the flow hash associated with the rule or state which it was matched against, in the mbuf structure.

In one embodiment, the hashing algorithms used to compute the flow hash differs across computing system platforms depending on performance. The following table illustrates exemplary platforms and corresponding hashes:

| Platforms | Hash Algorithms |
| --- | --- |
| Intel 32-bit | MurmurHash3 (32-bit, i386 variant) |
| Intel 64-bit | MurmurHash3 (128-bit, x86_64 variant) |
| ARM, et al | 32-bit JHash |

Flow Control & Advisory for TCP:

Using the queue management techniques described herein, applications sending using TCP are flow-controlled when the number of packets per flow queued at the interface reaches an upper limit. Instead of using an indicator like explicit congestion notification (ECN) or packet drops, the interface provides a flow-advisory feedback to the transport layer. This can be done without any packet loss.

A flow advisory on a connection is received from AQM when one of the following two conditions is true:

1. The send rate of a TCP connection increases above the bandwidth supported on the link.

2. The available bandwidth on a wireless link, which is the first hop, from the device goes down In both of these cases, sending more packets will accumulate packets in the interface queue and will increase the latency experienced by the application. Otherwise, it might cause packet drops which will reduce the performance because the TCP sender will have to retransmit those packets. By using the flow-advisory mechanism, the TCP senders can adapt to the bandwidth available without seeing any packet loss or any loss of performance. The interface queue will never drop a TCP packet but it will only send a flow advisory to the connection. Because of this mechanism, buffering in device drivers was reduced by a significant amount resulting in improved latency for all TCP connections on the device.

The main response of a TCP connection to a flow advisory is to reduce its congestion window which will in effect reduce its sending rate. This is done by backing off the slow start threshold and allowing the connection to enter congestion avoidance phase. But if the connection is already in recovery, it means that the connection has already experienced packet loss in that round-trip time and has already lowered its sending rate. In this case, the congestion window is not reduced any further.

A connection that is flow-controlled will avoid making the socket writable until flow control is lifted. This will prevent the application from writing more data that might just get buffered up in the network stack when it can not send packets out on the interface. This will help interactive applications that need to send only the latest updates and would rather throw away the older updates.

While in a flow-controlled state, if there is an indication of packet loss in TCP acknowledgements received in the form of duplicate acknowledgements or SACK information then the connection will abort flow-control and start fast recovery to retransmit the lost data right away. This will not increase latency any more because the rate of packets sent during recovery is limited. Since the interface is guaranteed to not drop any TCP packets, the connection will be able to retransmit the lost data as quickly as possible.

When a connection is in a flow-controlled state, it means that packets are leaving the interface slower than before. In this situation, there can be packets waiting in the interface queue ready to be sent. Usually these are the packets at the end of the last send window. If this wait time is more than the retransmit timeout calculated on the connection, then a timeout will fire. At this point, retransmitting already sent data might create duplicate copies of the same packet in the interface queue. This might generate duplicate acknowledgements later and cause the connection to go into recovery unnecessarily.

To avoid this confusion, a flow-controlled TCP connection will avoid retransmitting packets from a retransmit timer until later. If the wait is too long, then the connection might get timed out instead of waiting forever and an error will be returned to the application.

Every time a retransmit timeout fires, the timer is backed off before trying again. This will help to detect a sudden increase in delay on the link. But for flow controlled sockets, the delay might be a result of the flow being blocked temporarily. When the connection comes out of the flow-controlled state, the back-off is undone. This will help to fire the retransmit timer in a timely fashion from then on.

When the packets in the interface queue flow out and the queue levels fall below a threshold, the interface will generate a flow advisory to let all the flows that were flow-controlled to start sending data again. At this point, the TCP sockets also become writable and the applications can start writing data.

When flow-control is lifted, the connection will send new data that was never sent before. This will generate new acknowledgements and will start the ACK timer. It will also help to detect if there was any data loss prior to flow-control that was not already detected. If there is no new data to be sent, the retransmit timer will fire soon and it will trigger retransmission of any outstanding data that has not been acknowledged.

Using Flow advisory and flow control mechanism a TCP connection will be able to adapt to the variations in link bandwidth and will be able to minimize delay induced by buffering packets at multiple levels on the host.

Flow Control & Advisory for UDP:

In one embodiment, a UDP socket is capable of flow control only if it is connected to the peer using a connect() system call. When the number of packets from a UDP flow in the interface queue is more than the limit for flow control, an advisory is generated. The socket is marked as flow-controlled at that point. Unlike TCP, the interface queue will drop all UDP packets generated thereafter. The socket will not be writeable which means an application waiting for write event using select or poll or kevent system classes will not get the event until flow-control is lifted. If an application writes data to the socket anyways, the packet will be dropped by the socket layer and an error (ENOBUFS) will be returned.

This is different from the previous behavior where all UDP writes succeeded only to drop the packet later by the driver. The UDP flow control and advisory will give immediate feedback to the applications so that they can reduce their send rate immediately. For instance, a video application can change it's encoding to send less data over the network.

Since the packet is dropped at the socket layer on a flow-controlled UDP socket, it saves a lot of CPU utilization compared to the previous where the packet was processed and sent all the way to the driver only to be dropped. Another advantage is that a flow controlled UDP flow can not overwhelm the interface. This will reduce cause packet loss and improve latency for the other flows on the host.

In one embodiment, the tracking of flows at the interface layer is made possible due to the use of Stochastic Fair Blue (SFB) (see Appendix B to this patent application) as the queuing algorithm. In one embodiment, the implementation of SFB uses a 2-level bloom filter, whereby a flow (as indicated by the flow hash value 1001) maps to exactly one bin at each SFB level 1009. Each bin of this embodiment tracks the number of packets as well as the flow drop/mark probability. In one embodiment, SFB also tracks the list of flows being flow controlled. The thresholds for flow control and flow advisory are based upon the bin allocation (currently set to ⅓ of the queue limit). The bin probability is updated accordingly, but it is currently not used for rate limiting.

Flow Suspend & Resume

In one embodiment, certain sockets that are marked as "opportunistic" are suspended when a network interface is throttled. Packets generated by such sockets will be dropped in one embodiment when they are enqueued on the affected queues. In one embodiment, a NOTE_SUSPENDED event will be generated on the socket in order to inform the application that traffics on the socket are indefinitely blocked. The Application may then decide whether or not to abort the connection. When the interface is no longer throttled, the affected queues will no longer block packets, and a NOTE_RESUMED event will be generated on the affected sockets. Internally, the same mechanism may be Oused by flow control and advisory is used for implementing suspend and resume.

Inbound Network Layer Scheduling Model

Opportunistic polling of one embodiment uses a network driver input model as illustrated in FIG. 11B. The driver component 1111 polls the hardware 1112 for incoming packets and the IO networking interface 1110 polls the driver. Each receive queue instance polls (3) the IP networking interface 1110 of the driver 1111 to determine if there are any packets associated with that receive queue ready to be dequeued (3) and passed up to the network stack 1108 (4) and subsequently up to the requesting application 1107 (5) (which, as illustrated at (6) polls the receive queue instance 1109 with which it is associated for new packets).

Thus, with this new model, inbound packets are no longer pushed up to the networking stack by the driver/family as illustrated by operations 1-6 in FIG. 11A. Instead, inbound packets reside in the driver's receive queue 1109 until they are dequeued by the networking stack 1108. In one embodiment, this involves turning off the client device hardware's receive interrupt (IRQ). One reason the described embodiment is unique is that the networking stack 1108 (in conjunction with the driver) alternates between polling (FIG. 11B) and the legacy model (FIG. 11A), depending upon the load factor. In one embodiment, when the load reaches a predetermined threshold (e.g., a specified level of packets built up in the driver's queues) then the system may transition to the legacy model (FIG. 11A). When transitioning to the legacy model, the hardware's receive IRQ is turned on and the driver 1105 pushes the packets up from the IO networking interface 1104 to the appropriate receive queue instance 1103 and ultimately to the requesting application 1101 via the network stack 1102.

Kernel Programming Interface (KPI)

In one embodiment, in order to accommodate the above configuration, a set of private KPIs is employed:

ifnet_allocate_extended( )

Allocate an ifnet instance which supports the new input model, with several related fields:

| ifnet_init_eparams fields | Descriptions |
| --- | --- |
| input_poll( ) | This callback is called by the network stack 1108 to retrieve one or more packets from the driver 1111 which implements the new driver input model. |
| input_ctl( ) | This callback is invoked by the network stack 1108 to inform and instruct the driver 1111 about poll vs. legacy model transition. |
| rcvq_maxlen | The maximum size of the driver receive queue. | ifnet_input_extended( )

Analogous to ifnetinput( ), except that the driver 1111 provides the networking stack 1108 with all of the information related to the beginning and end of the packet chain, as well as the total packet and byte counts. Drivers which already possesses this information are encouraged to utilize this new variant, as it allows for better efficiency. This may be used regardless of whether the driver adopts the new model (FIG. 11B).

In one embodiment, a driver that has registered itself as supporting the new input model (FIG. 11B) is flagged with the IFEF_RXPOLL flag.

Data Link Interface Layer (DLIL) 208

Input Threads:

In one embodiment, input packet processing throughout the networking stack occurs within the context of a DLIL input thread. Some interfaces have their own dedicated input threads, while others share a common (main) input thread. In one embodiment, there are 3 variants of DLIL input threads:

1. Main

In one embodiment, the main input thread is used by the loopback interface, as well as other interfaces which don't get their own dedicated input threads (i.e. anything but Ethernet/PDP or those that don't support RXPOLL). This thread is also used for handling all protocol registrations and packet injections. This is implemented in dlil_maininput_thread_func( ).

2. Legacy

In one embodiment, legacy is used by Ethernet/PDP interfaces which do not adopt the RXPOLL model, implemented in dlilinput_thread_func( ).

3. RXPOLL

In one embodiment, RXPOLL is used by any interface which adopts the RXPOLL model, implemented in dlil_rxpollinput_thread_func( ).

Poller Thread

In one embodiment, an interface which supports the new input model (RXPOLL) uses a dedicated kernel thread, the "poller thread" (illustrated at 1202 in FIG. 12) whose job is to invoke the driver's input_poll( ) callback in order to retrieve one or more packets from the driver; this occurs when polling is ON, otherwise the poller thread 1202 stays dormant. This thread is analogous to the work loop thread illustrated at 1201 in FIG. 12, where they both end up calling ifnet_input( ) in order to deposit the packets to the receive queue of the RXPOLL-capable DLIL input thread.

The packets are then sent up the networking stack for further processing from the context of this DLIL input thread.

Opportunistic Polling

In one embodiment, RXPOLL-capable interfaces transition between IFNET_MODEL_INPUT_POLL_OFF and IFNET_MODEL_INPUT_POLL_ON modes. In one embodiment, the former is the default/initial mode; the network stack chooses this mode for the interface when it determines that the load factor is low. The load factor is currently determined by looking at the EWMA of the packets and bytes in the DLIL receive queue (P_avg, B_avg) and the EWMA of the DLIL input thread wakeup requests (W_avg).

Figure 12:
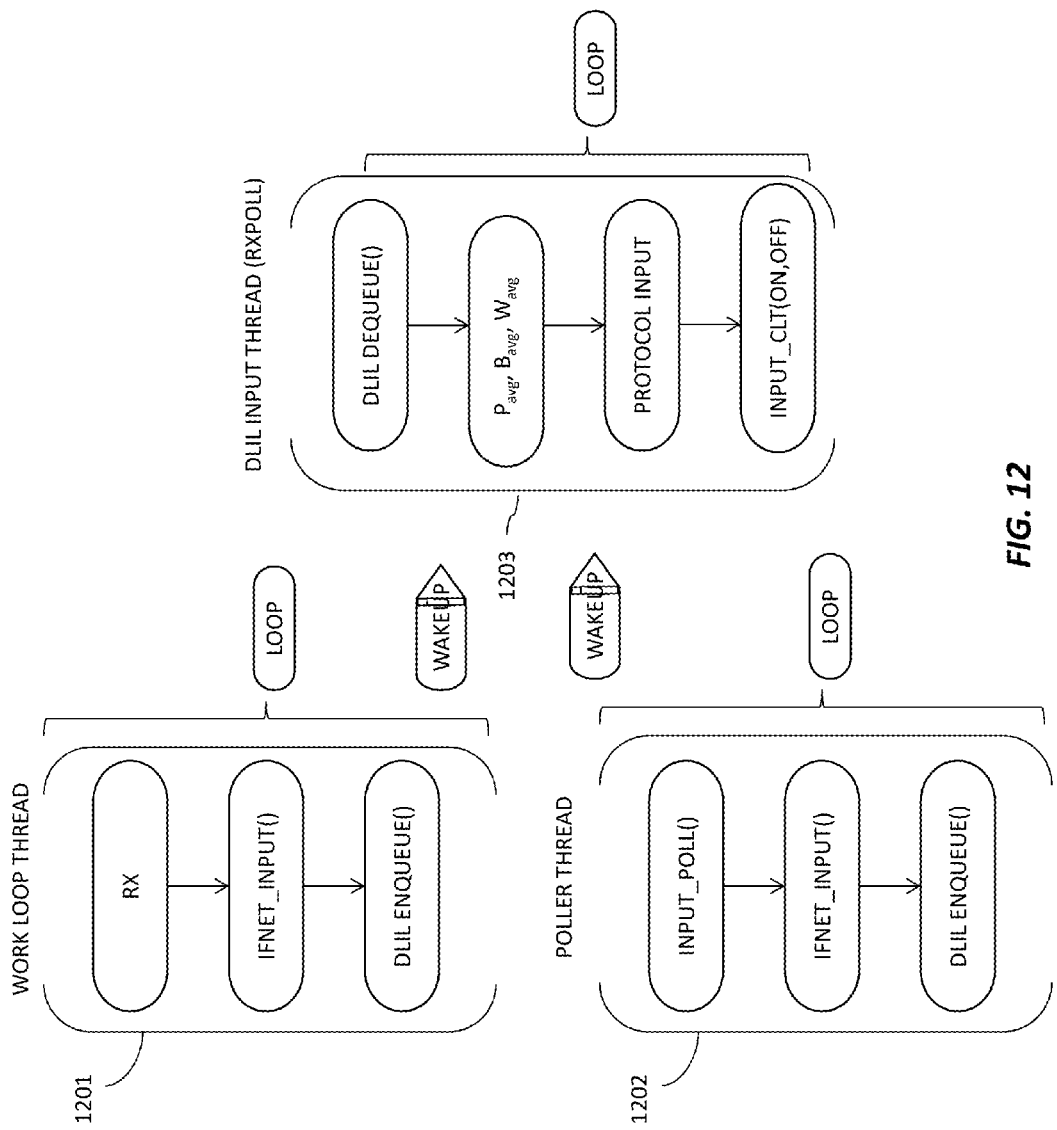
FIG. 12 illustrates an exemplary work loop thread, poller thread, and DLIL input thread.

Referring to the DLL input thread 1203 in FIG. 12, in one embodiment, switching to the IFNET_MODEL_INPUT_POLL_ON is done when (P_avg≥P_hiwat && (B_avg≥B_hiwat||W_avg≥W_hiwat)), where P_hiwat, B_hiwat and W_hiwat are the high-watermark values for the packets, bytes and the wakeup requests, respectively. Conversely, switching to the IFNET_MODEL_INPUT_POLL_OFF is done when (P_avg≤P_lowat && B_avg≤B_lowat && W_avg≤W_lowat), where P_lowat, B_lowat and W_lowat are the low-watermark values for the variables.

In one embodiment, these low- and high-watermark values are currently chosen arbitrarily based on certain workloads, and they should be adjusted accordingly to accommodate future workloads (and varying link speeds.)

In one embodiment, The bulk of the hybrid polling logic resides within dlil_rxpoll_input_thread_func( ), where the transitions between the modes take place by calling the driver's input_ctl( ) callback based upon the above logic. Care is taken to rate limit the transitions, such that they do not occur too often (the hold time is set to 1 sec by default.)

FIG. 12 illustrates one embodiment of the relationship between the threads 1201-1203 when polling is turned OFF/ON.

In one embodiment, the main difference between polling OFF/ON mode lies in the context and frequency in calling ifnet_input( ) or ifnet_input_extended( ).

In one embodiment, when polling is OFF, the work loop thread 1201 gets scheduled as part of the host CPU handling a receive IRQ from the hardware; this IRQ signals the host that the device has transferred one or more packets to the host (e.g. via DMA). Regardless of the level of IRQ coalescing done at the hardware, the frequency of having this IOKit work loop thread scheduled is driven by the rate of inbound packets. The costs associated with this scheduling (context switches, etc.) are quite significant, especially given the fact that our system architecture routes all IRQs to CPU0. Therefore, in one embodiment, upon detecting a high load factor, polling is turned ON.

When polling is ON, the work loop thread 1201 is quiesced by virtue of turning off the receive IRQ. Packets still get transferred to the host from the device, and they accumulate in the driver's 1111's receive buffer until they are retrieved by networking stack 1108 via the input_poll( ) callback. The poller thread 1202, which is now active, performs the equivalent functionalities of the work loop thread 1201, except that the frequency of which this thread gets scheduled is tightly controlled by the networking stack 1108.

In one embodiment, polling results in improved performance given the amortizing of per-packet processing costs related to receiving packets from the medium. When polling is turned ON, the network stack instructs the driver to go into polling mode. While in polling mode, the driver would turn OFF its receive interrupts or trap handlers associated with the notification of packets arriving from the hardware. Packets will keep on coming to the host's memory (from the device, via DMA or equivalent), except that the CPU will not be interrupted. This reduces the load on the CPU as each interrupt would normally trigger a series of work to process it; and it would have some negative effects on performance, as it preempts whatever is running on the CPU at the time. The network stack then polls at 1 millisecond interval (by default; this is configurable) and pulls packets from the driver during each interval. If it detects that the packet rate has dropped, polling mode is exited and interrupt is reenabled.

In one embodiment, polling may be employed to reduce power consumption (e.g., when in "low-power" mode) or based on user activity (or inactivity). For example, if the system is in low-power mode, this information is supplied to the network stack, and the network stack may then choose to enter polling mode on all eligible network interfaces. The network stack would then be informed when the system is no longer in low-power mode so that polling mode can be exited.

With respect to use activity, if the system is busy handling User Interface inputs, this information is supplied to the network stack, and the network stack may then choose to enter polling mode on all eligible network interfaces. The network stack would be informed when the system is no longer busy handling UI inputs, so that polling mode can be exited.

Receive Queue

Figure 13:
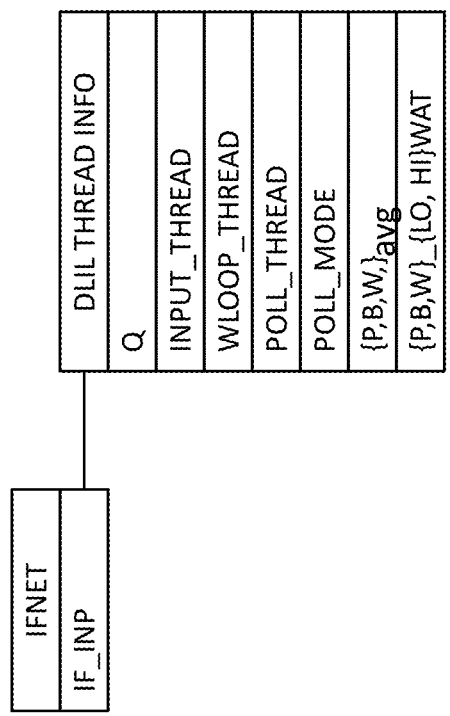
FIG. 13 illustrates an exemplary set of thread data in accordance with one embodiment.

In one embodiment, the if_inp member of ifnet holds the receive queue for the DLIL input thread 1203. In one embodiment, this data structure contains the information illustrated in FIG. 13.

Unlike its transmit counterpart, the receive queue is associated with a DLIL input thread instance, rather than with an interface. As mentioned above, certain types of interfaces share the common (main) input thread, while others get their own dedicated input threads. Also unlike transmit where there may be up to N transmit queues, there is currently only 1 receive queue instance per input thread. This structure also holds the information about the actual kernel threads used for input, work loop 1201, as well as the poller threads 1202. In one embodiment, all of these threads are configured to share the same thread affinity tag, in order for them to be scheduled in the same processor set (for better cache locality). The parameters needed for opportunistic polling (e.g. mode, {P,B,W}_avg, {P,B,W}_{lo,hi}wat) also reside within this structure in one embodiment.

Link Events

In one embodiment, events related to the interface are sent from the networking stack 102 to the attached scheduler 116 and queue management logic 115, and further onto all class queue instances 110-112. This allows for the scheduler, queue management logic 115 and its classes to adapt their parameters accordingly, if needed. The events are as follows:

| Events | Descriptions |
| --- | --- |
| CLASSQ_EV_LINK_SPEED | Effective link rate has changed, as reported by the driver (or due to changes in TBR.) |
| CLASSQ_EV_LINK_MTU | Link MTU has changed, as resulted from SIOCSIFMTU. |
| CLASSQ_EV_LINK_UP CLASSQ_EV_LINK_DOWN | Link state has changed (up or down), as resulted from setting/clearing IFF_UP. |

As mentioned above, embodiments of the invention include support for two different modes of scheduling: (1) scheduling at the network stack layer and (2) scheduling at the driver layer. The driver can choose which type of scheduling to use. In one embodiment, if the driver is implementing 802.11n, then it may choose to perform the scheduling using the four service classes defined by WMM (see, e.g., FIG. 7 illustrating the 10:4 mapping between service classes and queue instances) while if the driver is implementing any other interface (e.g., 102.11b/g, 3G, Ethernet, etc) it may choose to have scheduling performed at the network layer (see, e.g., FIG. 6 illustrating a 1:1 mapping between service classes and queue instances).

In one embodiment, in the driver managed model all of the queues may be set up as with the network stack managed model, but the scheduling is performed by the driver scheduler 160. As such, the driver-based scheduler will then request a number of packets for each dequeue operation for a particular class based on priority (i.e., using the 4 classes for WMM).

While the schedulers 116, 160 decide which queue from which to dequeue a packet, the queuing algorithm implemented by the queue management logic 115 (also referred to as the "dropper" because it has the option to either drop or queue packets) determines which queue into which a packet should be queued prior to dequeue. In one embodiment, the scheduler 116 hands the packet to the queue management logic 115 which then determines whether the packet is dropped or enqueued.

As mentioned above, in one embodiment, the scheduler 116 used by the network stack uses quick fair queuing (QFQ) while the driver scheduler 160 uses traffic class queuing (TCQ) each of which are described in detail above.

Additional Details for Flow Control and SFB Queuing

In one embodiment, the same queue management logic 115 is used regardless of the type of scheduler selected. Stochastic fair blue (SFB) may be used as the default queueing algorithm implemented by the queue management logic 115 for both the driver managed scheduler 160 and the network level scheduler 116. As indicated in FIG. 10A, flow hashing allows packets from different flows/sockets to be easily tracked within both the network and driver layer and utilized by the SFB algorithm. When a socket 204 is initially connected, the hash value 1001 is computed, stored in the socket data structure and is used for the lifetime of the connected socket 204. Any time data is sent down from the socket to the lower layers (e.g., transport 205, IP 206, sendq 306, and driver 150), the flow hash value 1001 is sent with the packet and is used to uniquely identify the socket/flow. Once the flow is identified, a counter is incremented within one or more of the SFB bins 1009 (indicated by variable C in FIG. 10A) as each new packet is queued and decremented as each packet is dequeued. Thus, the number of packets currently queued for each flow is known and is used to perform flow control for that flow. In one embodiment, if a particular flow has packets queued beyond a specified threshold (as indicated by counter C>=FADV THRESHOLD in FIG. 10A), then a probability value for that flow is incremented by some interval. Once the probability reaches its limit (e.g., 1), this indicates that there are too many packets (i.e., the application is sending too fast) and further packets for this flow are dropped.

FIG. 10A illustrates this mechanism in detail. In one embodiment, the flow hash is used to tag every packet that goes down from the socket 204 to the lower layers, so these lower layers can recognize which packets below to which flow and provide feedback to the network layer. Packets are queued within the sendq 306 associated with the flow and, as mentioned, SFB uses the flow hash to increment and decrement the counters (C1, C2) stored within the SFB bins 1009 for each flow. SFB uses the counters in its in memory data structures to determine if the queuing threshold has been exceeded. For example, if the number of packets queued for a flow is 50, which is at the threshold, it stores state for that flow and sends feedback to the transport layer, turning on flow control for the socket 204 which supports that flow. Thus, the flow moves from a normal to a flow controlled state and remains in this state while packets get dequeued from the queue and sent over the link.

Once the number of packets in the queue drops below a threshold, the queuing algorithm wakes a flow advisor thread 1050, which wakes up and turns off flow control for the socket 204. Consequently, the socket may then transmit packets down through the lower layers at will, until it is placed in a flow controlled state again. Thus, FIG. 10A illustrates a mechanism which provides feedback and allows flows on the same host to be moved between a flow controlled/normal state without relying on internal mechanisms in TCP such as explicit congestion notification (ECN). This improves performance because the unnecessary work done by sending data down to the network stack just to be dropped is reduced. In addition, it allows the queue size in the driver to be decreased without packet drops. This is in contrast to the older mechanisms in which the application blindly transmits packets down the stack only to be dropped by the driver. In contrast, in FIG. 10A, since the network stack knows what is going on the link because of queue monitoring, it can use this information to intelligently change the behavior of the transport mechanism.

Figure 10B:
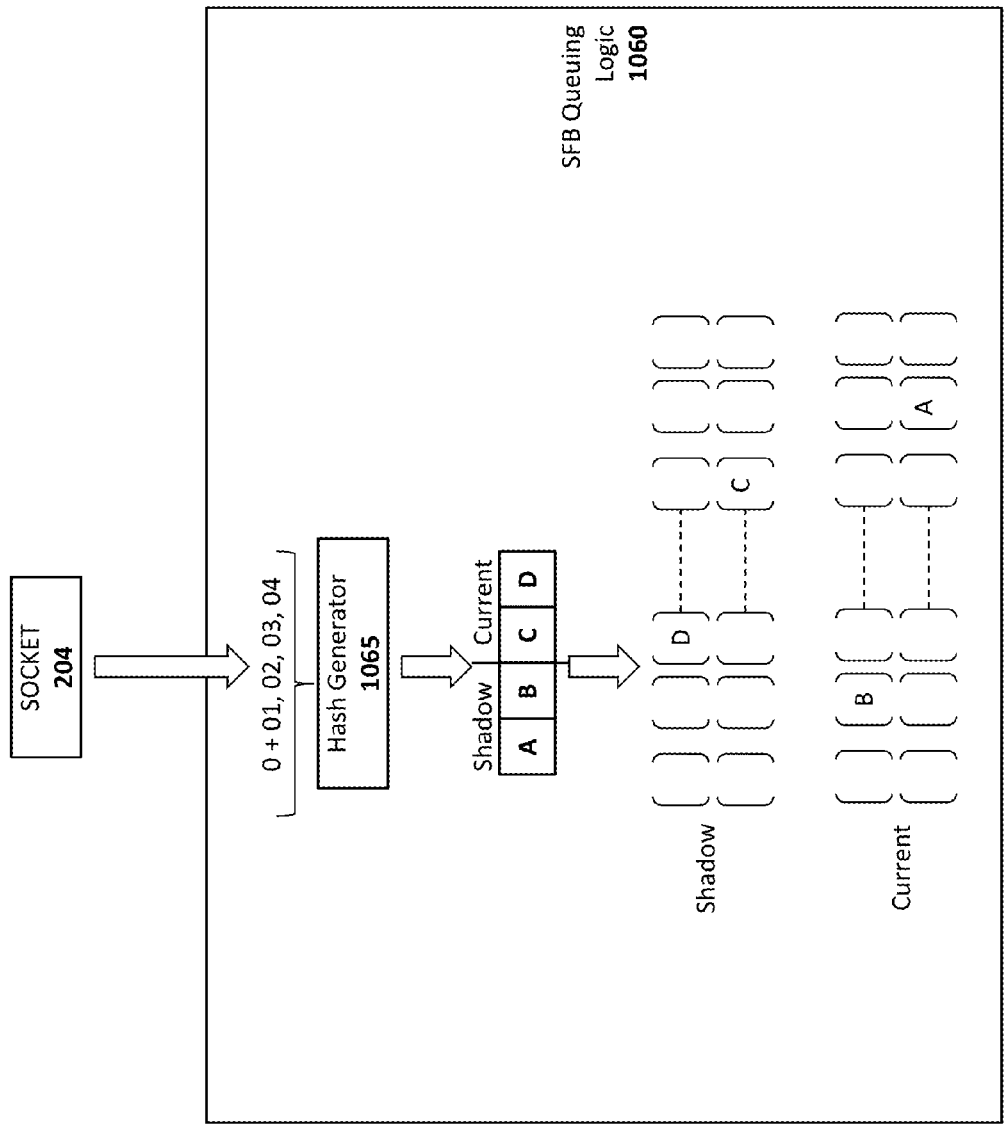
FIG. 10B illustrates a current set of bins and a shadow set of bins used by the queuing algorithm in one embodiment.

In one embodiment illustrated in greater detail in FIG. 10B, the SFB algorithm takes the hash value of the packet and computes another hash which is unique for SFB and which is used to pick the bits for the flow. As illustrated, the original hash value computed by the socket is 4 bytes (01, 02, 03, 04) this may be provided to the hash generator 1065 of the SFB queuing logic 1060. Certain flow hashes may be provided with a value of 0 and used to identify flows for which the flow control mechanisms described in here are not used. In one embodiment, SFB generates a random number and computes the new hash using the random number (A, B, C, D). It uses these four values to populate two sets of bins: a current set and a shadow set, each of which has two levels, as shown in FIG. 10B. The two levels are implemented as an array which is indexed using the new hash values (each slot is 256 bits in one embodiment). Thus, the flow is mapped into the SFB bins using the flow hash value. To check whether a flow exists, the SFB bins may be checked. The bloom filter functionality of the SFB algorithm is capable of checking whether a particular flow does not exist within the SFB bins. If one exists, it can be indexed to determine the data associated with that flow (e.g., the probability and counters mentioned above). This data is maintained by SFB as long as a flow still exists. The shadow set is used because at some interval SFB rehashes. Because of the property of a bloom filter, many things can map to the same bin. If there are a lot of sockets, some sockets that are sending data too much can impact other sockets that are not sending a lot of data which are mapped to the same bin. Thus, SFB periodically re-computes the internal hash based on a new random number. After a rehash, the bins may move around for each flow. Additional details of the SFB algorithm can be found in the reference *Stochastic Fair Blue: A Queue Management Algorithm for Enforcing Fairness* which is attached as Appendix B to this patent application and incorporated herein by reference. In this case, the shadow set may be used to move the data to the new bins.

Application-Driven Traffic Classifications and Flow Feedback, Including Opportunistic Behavior, Flow Control, Traffic Suspension, and Transport Layer Improvements The application-driven traffic classifications described above with respect to FIGS. 6-8, may be used to enable various opportunistic behaviors. As mentioned, each application may explicitly state what the traffic class should be for its sockets. For example, say one application is backing up date using a low priority traffic class such as BK_SYS but the user wants to make a voice call. Because of the way GSM works, if a voice call is in progress while network data is being sent, then this increases the probability of the voice call to deteriorate or drop. Similarly, if a user opens a web browser while on a call, then it may also impact the call. To alleviate this, in one embodiment, traffic classes are used to suppress unnecessary traffic when a user is on a voice call. Any non-urgent traffic (e.g., background traffic—BKS_SYS) may be suspended during the voice call. In one embodiment, for suspended sockets, when a dequeue happens, the system pretends that there is nothing to dequeue and when an enqueue happens, packets are dropped. Thus, the transmitting application will see this as if the network has stopped and may wait before trying again. If the call is relatively quick, then it will resume when the call has ended (without shutting down the socket entirely). These techniques may be used for traffic classes other that BK_SYS (e.g., BK, BE, etc). In one embodiment, the flow control/advisory mechanism described above is also used to suspend sockets in these situations (e.g., if suspended, a flow control indication is sent). Thus, by classifying traffic for certain sockets (e.g., BK_SYS) an intelligent feedback mechanism is provided for handling traffic suspension and opportunistic behavior for these sockets is enabled in the kernel.

Note that the suspended state is different from the flow controlled state. In the flow controlled state, the application may still be sending data but in the suspended state, the link is blocked (e.g., because a voice call takes a long time). Thus, in the suspended state, it is beneficial to stop sending any more packets because they will just get dropped (because the queue is suspended). In one embodiment, the suspended application may choose to start a timer and, if suspended too long, simply close the connection.

In summary, in one embodiment, when a voice call is received/made:

(1) An authoritative entity in the system configures the cellular network interface(s) into opportunistic throttling mode.

(2) The opportunistic mode gets configured on the packet scheduler of each affected interface.

(3) The scheduler goes through all transmit queues that are to be suspended in this opportunistic mode; at present this applies only to BK_SYS transmit queue. Each affected transmit queue goes into a suspended mode; all existing packets are flushed, and further enqueues will cause drops.

(4) All opportunistic sockets (sockets with BK_SYS classification) will receive a "suspend event."

In one embodiment, when a voice call is terminated:

(1) An authoritative entity in the system removes opportunistic throttling mode from the cellular network interface(s).

(2) The packet scheduler for each affected interface exits opportunistic throttling mode.

(3) The scheduler goes thru all transmit queues that were suspended in this opportunistic mode; at present this applies only to BK_SYS transmit queue. Each affected transmit queue is resumed; further enqueues are allowed.

(4) All opportunistic sockets (sockets with BK_SYS classification) will receive a "resume event."

In addition, performance optimizations are realized for the receive side, referred to herein as "large receive offload." In one embodiment, this works by reducing the per packet cost by calling functions in the network stack. For example, 10 packets are received, rather than dealing with all 10, only 1 or 2 may be processed. For certain classes such as the AV class (streaming video), we can enable this optimization. With AV video applications the software buffers video for several seconds before it starts to play. So because of this, this application may receive performance benefits using the large receive overload techniques, because they not delay sensitive.

In one embodiment, because of the feedback provided up the stack, the manner in which TCP sends and receives may be adjusted for certain sockets. For example, if the application classifies a flow as BK or BK_SYS, TCP will be less aggressive. For example, if a socket is BK and high congestion on this link is detected, the application may back off and receive a better response time for other flows (e.g., a socket backing up to the network may be delayed to receive HTTP on another socket). All of this is possible because applications are able to explicitly specify socket traffic classes.

As previously mentioned, in one embodiment, the highest classification (CTL) is used for network control packets which may include ARP, ACK responses, neighbor discovery for IPV6, multicast join and leave, DCP-related packets, IPV6 station router advertisement packets, and DNS packets. Consequently, DNS operations will not be delayed if the user is performing a large upload using a lower priority socket. Similarly, ACK responses will not be delayed as the result of activity on lower priority sockets. Control packets of this type are very small and can go out without any delay.

In addition, as mentioned, the techniques and architecture described above provide for built in TCP and UDP backoff mechanisms during flow control and suspension states. Usually TCP responds to congestion itself by backing off (e.g., using ECN as described above). TCP sends a packet and if does not get an acknowledgement (ACK), it sends the packet again and again and backs off with each retransmission. This retransmission is a waste of resources if it is known that the packet is still in the interface queue 151-153 and will be sent only after the link becomes available. Thus, in this situation, there is no need to back off and retransmit using the built in TCP or UDP mechanisms. Instead, using the techniques described herein, a flow control advisory may be issued to disable the retransmit function.

In addition, in one embodiment, the retransmit timer used for TCP may be tweaked to operate more efficiently. Typically, TCP backs off the retransmit timer when no ACKs are received (e.g., increasing by 2× each time). Thus, retransmit timer can become several seconds. Since feedback from the interface is provided as described above, this backoff does not need to occur. Once we get a flow control advisory, we can automatically wait because we know the packet is queued (and don't want to keep resending). However, in one embodiment, the retransmit timer may be used after the flow control has been turned off for the socket.

In addition, the flow advisory is propagated all the way to the application which does not write any more data to TCP. The application could therefore drop all of the stale data (e.g., old video frames) and send newer data when flow control is turned off. This is particularly beneficial for interactive video data, where audio and video may be out of sync if the application does not drop stale data.

Similar principles may be applied to applications which transmit with UDP. Without the flow advisory techniques described herein, UDP does not provide any feedback to its applications. Thus, if the interface drops, the application does not know and continues to transmit packets, which must therefore be buffered at the lower levels of the stack, wasting resources. By contrast, when in a flow controlled state, all of the writes by the application may be dropped right away (thereby saving buffering resources). Doing the above reduces a significant amount of delay which would result by buffering packets.

Opportunistic Polling Mechanisms for Handling Inbound Network Traffic, Improving Network Performance and Handling Denial-of-Service Attacks As mentioned above, in one embodiment, RXPOLL-capable interfaces transition between an input polling off mode and an input polling on (or legacy) mode of operation (e.g., IFNET_MODEL_INPUT_POLL_OFF and IFNET_MODEL_INPUT_POLL_ON. In one embodiment, the input polling off mode is used as a default/initial mode and is selected by the network stack when it determines that the load factor is low. The load factor may be determined by evaluating the variables P_avg, B_avg, and W_avg (the values for the number of packets, bytes and the wakeup requests, respectively). Referring to the DLL input thread 1203 in FIG. 12, in one embodiment, switching to the input poling on mode is done when (P_avg≥P_hiwat && (B_avg≥B_hiwat|| W_avg≥W_hiwat)), where P_hiwat, B_hiwat and W_hiwat are where P_hiwat, B_hiwat and W_hiwat are low-watermark values for the variables.

Conversely, switching to the polling off mode is done when (P_avg≤P_lowat && B_avg≤B_lowat && W_avg≤W_lowat), where P_lowat, B_lowat and W_lowat are the low-watermark values for the variables.

In one embodiment, these low- and high-watermark values may be chosen arbitrarily based on certain workloads, and they should be adjusted accordingly to accommodate future workloads (and varying link speeds.)

Turning polling on in this manner, based on a high load factor, improves performance and prevents denial of service attacks. This is because, using the polling mechanism, the receive queue at the network layer will only request packets from the queues at the driver layer when it has sufficient room to queue them. When it does not have room, it will not poll to request more packets and packets to be dropped by the interface (i.e., when the driver layer queues are filled up). Thus, denial of service is prevented at the driver layer and is not propagated up to the network layers.

Different API Embodiments

The API implemented in one embodiment, is an interface implemented by a software component (hereinafter "API implementing software component") that allows a different software component (hereinafter "API calling software component") to access and use one or more functions, methods, procedures, data structures, and/or other services provided by the API implementing software component. For example, an API allows a developer of an API calling software component (which may be a third party developer) to leverage specified features provided by an API implementing software component. There may be one API calling software component or there may be more than one such software component. An API can be a source code interface that a computer system or program library provides in order to support requests for services from a software application. An API can be specified in terms of a programming language that can be interpretative or compiled when an application is built, rather than an explicit low level description of how data is laid out in memory.

The API defines the language and parameters that API calling software components use when accessing and using specified features of the API implementing software component. For example, an API calling software component accesses the specified features of the API implementing software component through one or more API calls (sometimes referred to as function or method calls) exposed by the API. The API implementing software component may return a value through the API in response to an API call from an API calling software component. While the API defines the syntax and result of an API call (e.g., how to invoke the API call and what the API call does), the API typically does not reveal how the API call accomplishes the function specified by the API call. Various function calls or messages are transferred via the one or more application programming interfaces between the calling software (API calling software component) and an API implementing software component. Transferring the function calls or messages may include issuing, initiating, invoking, calling, receiving, returning, or responding to the function calls or messages. Hence, an API calling software component can transfer a call and an API implementing software component can transfer a call.

By way of example, the API implementing software component 2010 and the API calling software component may be an operating system, a library, a device driver, an API, an application program, or other software module (it should be understood that the API implementing software component and the API calling software component may be the same or different type of software module from each other). The API calling software component may be a local software component (i.e., on the same data processing system as the API implementing software component) or a remote software component (i.e., on a different data processing system as the API implementing software component) that communicates with the API implementing software component through the API over a network. It should be understood that an API implementing software component may also act as an API calling software component (i.e., it may make API calls to an API exposed by a different API implementing software component) and an API calling software component may also act as an API implementing software component by implementing an API that is exposed to a different API calling software component.

The API may allow multiple API calling software components written in different programming languages to communicate with the API implementing software component (thus the API may include features for translating calls and returns between the API implementing software component and the API calling software component); however the API may be implemented in terms of a specific programming language.

Figure 14:
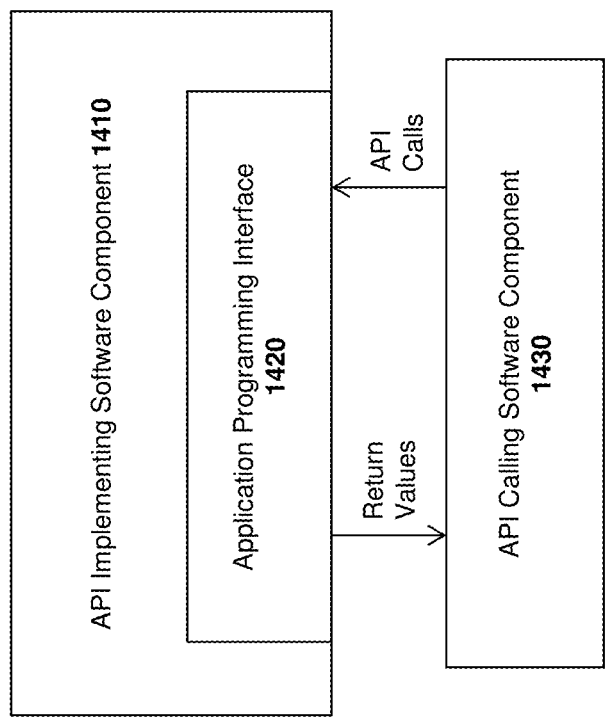
FIG. 14 illustrates an application programming interface (API) employed in one embodiment.

FIG. 14 illustrates one embodiment of an API architecture which includes an API implementing software component 1410 (e.g., an operating system, a library, a device driver, an API, an application program, or other software module) that implements the API 1420. The API 1420 specifies one or more functions, methods, classes, objects, protocols, data structures, formats and/or other features of the API implementing software component that may be used by the API calling software component 1430. The API 1420 can specify at least one calling convention that specifies how a function in the API implementing software component receives parameters from the API calling software component and how the function returns a result to the API calling software component. The API calling software component 1430 (e.g., an operating system, a library, a device driver, an API, an application program, or other software module), makes API calls through the API 1420 to access and use the features of the API implementing software component 1410 that are specified by the API 1420. The API implementing software component 1410 may return a value through the API 1420 to the API calling software component 1430 in response to an API call.

It will be appreciated that the API implementing software component 1410 may include additional functions, methods, classes, data structures, and/or other features that are not specified through the API 1420 and are not available to the API calling software component 1430. It should be understood that the API calling software component 1430 may be on the same system as the API implementing software component 1410 or may be located remotely and accesses the API implementing software component 1410 using the API 1420 over a network. While FIG. 14 illustrates a single API calling software component 1430 interacting with the API 1420, it should be understood that other API calling software components, which may be written in different languages (or the same language) than the API calling software component 1430, may use the API 1420.

The API implementing software component 1410, the API 1420, and the API calling software component 1430 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 15:
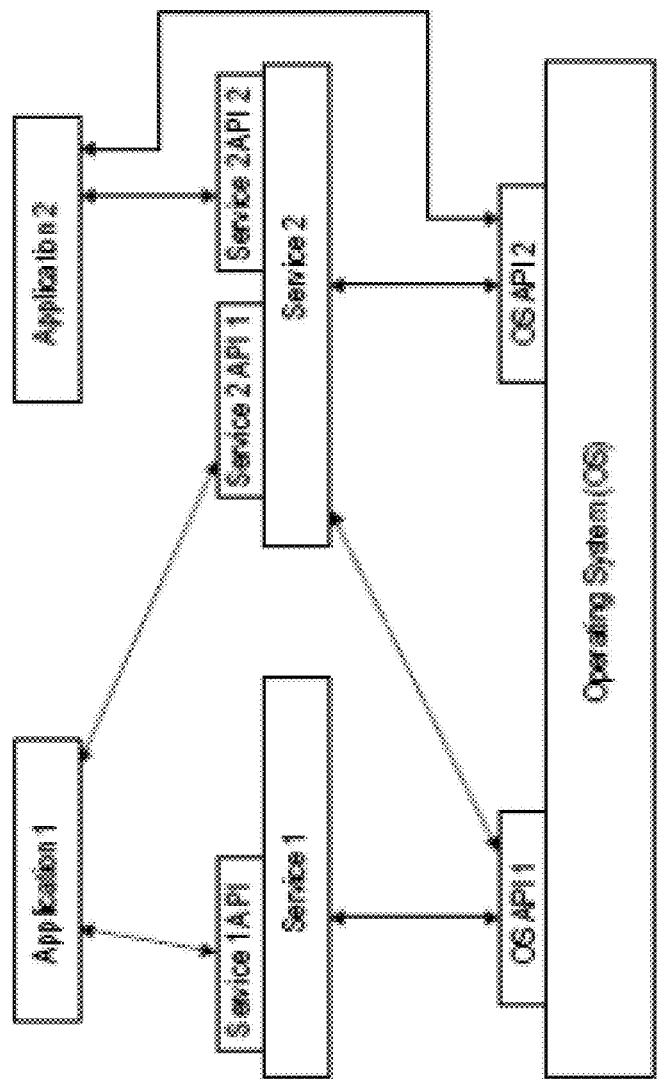
FIG. 15 illustrates a plurality of services with APIs employed in one embodiment.

In FIG. 15 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Exemplary Data Processing Devices and Interfaces

Figure 16:
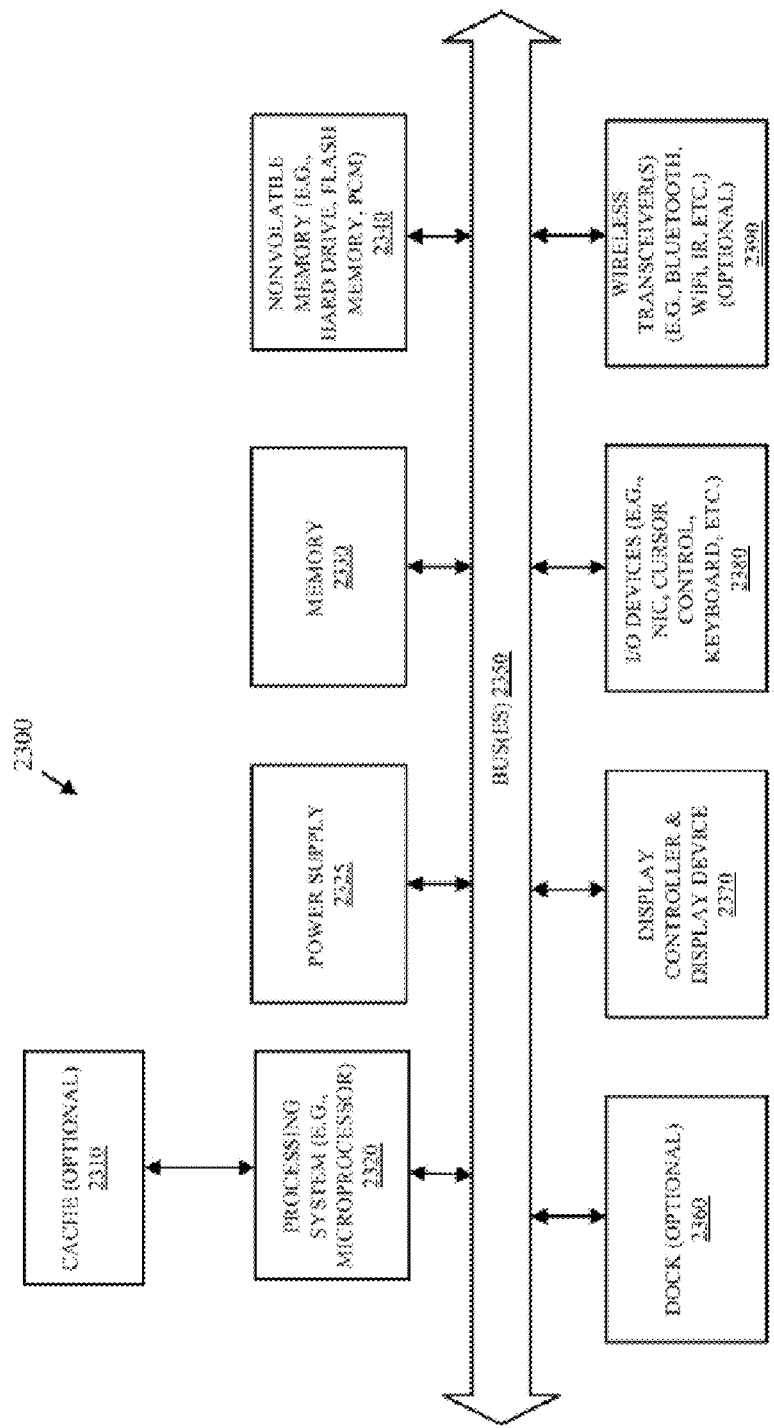
FIG. 16 illustrates one embodiment of a client-side data processing device.

FIG. 16 is a block diagram illustrating an exemplary computer system which may be used in some embodiments of the invention. It should be understood that while FIG. 16 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 16, the computer system 2300, which is a form of a data processing system, includes the bus(es) 2350 which is coupled with the processing system 2320, power supply 2325, memory 2330, and the nonvolatile memory 2340 (e.g., a hard drive, flash memory, Phase-Change Memory (PCM), etc.). The bus(es) 2350 may be connected to each other through various bridges, controllers, and/or adapters as is well known in the art. The processing system 2320 may retrieve instruction(s) from the memory 2330 and/or the nonvolatile memory 2340, and execute the instructions to perform operations as described above. The bus 2350 interconnects the above components together and also interconnects those components to the optional dock 2360, the display controller & display device 2370, Input/Output devices 2380 (e.g., NIC (Network Interface Card), a cursor control (e.g., mouse, touchscreen, touchpad, etc.), a keyboard, etc.), and the optional wireless transceiver(s) 2390 (e.g., Bluetooth, WiFi, Infrared, etc.).

Figure 17:
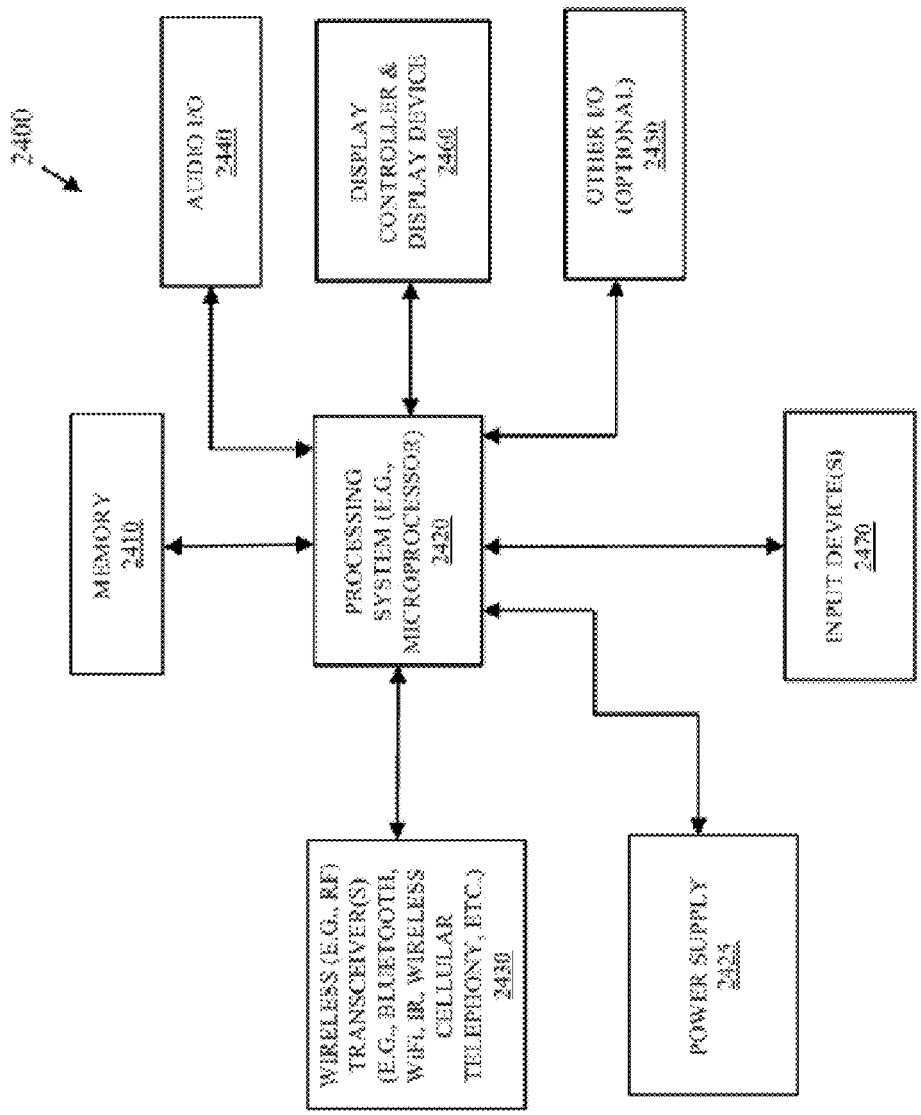
FIG. 17 illustrates another embodiment of a client-side data processing device.

FIG. 17 is a block diagram illustrating an exemplary data processing system which may be used in some embodiments of the invention. For example, the data processing system 2400 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 2400 may be a network computer or an embedded processing device within another device.

According to one embodiment of the invention, the exemplary architecture of the data processing system 2400 may used for the mobile devices described above. The data processing system 2400 includes the processing system 2420, which may include one or more microprocessors and/or a system on an integrated circuit. The processing system 2420 is coupled with a memory 2410, a power supply 2425 (which includes one or more batteries) an audio input/output 2440, a display controller and display device 2460, optional input/output 2450, input device(s) 2470, and wireless transceiver(s) 2430. It will be appreciated that additional components, not shown in FIG. 24, may also be a part of the data processing system 2400 in certain embodiments of the invention, and in certain embodiments of the invention fewer components than shown in FIG. 16 may be used. In addition, it will be appreciated that one or more buses, not shown in FIG. 16, may be used to interconnect the various components as is well known in the art.

The memory 2410 may store data and/or programs for execution by the data processing system 2400. The audio input/output 2440 may include a microphone and/or a speaker to, for example, play music and/or provide telephony functionality through the speaker and microphone. The display controller and display device 2460 may include a graphical user interface (GUI). The wireless (e.g., RF) transceivers 2430 (e.g., a WiFi transceiver, an infrared transceiver, a Bluetooth transceiver, a wireless cellular telephony transceiver, etc.) may be used to communicate with other data processing systems. The one or more input devices 2470 allow a user to provide input to the system. These input devices may be a keypad, keyboard, touch panel, multi touch panel, etc. The optional other input/output 2450 may be a connector for a dock.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although embodiments of the invention are described herein within the context of a mobile computing environment (i.e., using mobile devices 120-123; 601-603), the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

What is claimed is:

1. A data processing device for transmitting network packets comprising:
   packet classification logic for classifying packets according to different packet service classifications, wherein a packet to be transmitted is stored in one or more transmit queues based on the packet service classifications and wherein each packet is associated with a particular flow; and
   queue management logic for queuing packets in the one or more transmit queues utilizing a flow control policy implemented on a per-flow basis,
   wherein a number of queued packets for each flow is monitored and when a number of queued packets for a particular flow reaches a specified threshold, then flow control for that particular flow is turned on, and
   wherein the queue management logic implements a stochastic fair blue (SFB) algorithm to track the number of packets within each transmit queue.

2. The data processing device as in claim 1 wherein the SFB algorithm maps each flow to multiple SFB bins which track a number of packets queued in each transmit queue.

3. The data processing device as in claim 2 wherein the SFB algorithm maps each flow to four SFB bins, two of which comprise a current set and two of which comprise a shadow set.

4. The data processing device as in claim 2 wherein a flow hash value is calculated for each flow.

5. The data processing device as in claim 4 wherein the SFB algorithm calculates an SFB hash value using the flow hash value, the SFB hash value being used to index each of the SFB bins.

6. The data processing device as in claim 1 wherein, once the number of queued packets associated with a flow drops below a threshold, the SFB algorithm wakes a flow advisor thread, which wakes up and turns off flow control for a socket associated with the flow.

7. The data processing device as in claim 1 wherein turning on flow control comprises returning a specialized error code when queuing the packets for that flow.

8. The data processing device as in claim 5 wherein SFB bins are logically divided into a shadow set and a current set, the shadow set copying values to the current set when the SFB hash value used by the SFB algorithm is recalculated.

9. The data processing device as in claim 8 wherein the SFB bins in the current set and shadow set are separated into two levels of SFB bins, and wherein a set of data associated with each flow is stored at each of the two levels.

10. The data processing device as in claim 9 wherein a different portion of the SFB hash value is used to index each of the levels of the SFB bins from both the current set and the shadow set.

11. The data processing device as in claim 2 wherein each application executed on the data processing device may have multiple flows, each of which may be classified and queued in a queue associated with a service class for that flow and managed using SFB bins associated with that flow.

12. The data processing device as in claim 11 wherein N flows are mapped to M transmit queues, wherein N is greater than or equal to M.

13. The data processing device as in claim 1 wherein flows are explicitly set by each application.

14. The data processing device as in claim 1 wherein each packet service classification has a different relative priority associated therewith.

15. The data processing device as in claim 14 wherein network control packets are assigned to a packet service classification having a highest relative priority level.

16. The data processing device as in claim 1 wherein the transmit queues are managed at a networking layer of the data processing device and wherein the data processing device further comprises a network driver layer in communication with the networking layer, and wherein the networking layer notifies the network driver layer when a packet is ready to be transmitted from a queue, the network driver layer then dequeuing the packet from the queue and transmitting the packet over a network.

17. The data processing device as in claim 1 wherein packet service classifications are based on one or more of a delay tolerance level specifying how tolerant an application is to packet delay, a loss tolerance level specifying how tolerant an application is to packet loss, and an elasticity of flow level specifying how tolerant an application is to changes in bandwidth.

18. The data processing device as in claim 17 wherein packet service classifications having relatively lower delay tolerance level associated therewith are given relatively higher priority compared with packet service classifications having relatively higher delay tolerance levels.

19. The data processing device as in claim 17 wherein packet service classifications having relatively lower loss tolerance associated therewith are given relatively higher priority compared with packet service classifications having relatively higher loss tolerance.

20. The data processing device as in claim 17 wherein packet service classifications having relatively lower elasticity of bandwidth associated therewith are given relatively higher priority compared with packet service classifications having relatively higher elasticity of bandwidth.

21. The data processing device as in claim 17 wherein one or more of the following packet service classifications are used:
background system-initiated;
background;
best effort;
responsive data;
operations, administration, and management;
multimedia audio/video streaming;
responsive multimedia audio/video;
interactive video;
interactive audio; and
network control.

22. A machine-readable medium having program code stored thereon which, when executed by a processor in a data processing device, causes the processor to perform a plurality of operations comprising:
classifying packets according to different packet service classifications, wherein a packet to be transmitted is stored in one or more transmit queues based on the packet service classifications and wherein each packet is associated with a particular flow; and
queuing packets in the one or more transmit queues utilizing a flow control policy implemented on a per-flow basis, wherein a number of queued packets for each flow is monitored and when the number of queued packets for a particular flow reaches a specified threshold, then flow control for that particular flow is turned on, and wherein a stochastic fair blue (SFB) algorithm is used to track number of packets within each transmit queue.

23. The machine-readable medium as in claim 22 wherein the SFB algorithm maps each flow to multiple SFB bins which track a number of packets queued in each transmit queue.

24. The machine-readable medium as in claim 23 wherein the SFB algorithm maps each flow to four SFB bins, two of which comprise a current set and two of which comprise a shadow set.

25. The machine-readable medium as in claim 23 wherein a flow hash value is calculated for each flow.

26. The machine-readable medium as in claim 25 wherein the SFB algorithm calculates an SFB hash value using the flow hash value, the SFB hash value being used to index each of the SFB bins.

27. The machine-readable medium as in claim 22 wherein, once the number of queued packets associated with a flow drops below a threshold, the SFB algorithm wakes a flow advisor thread, which wakes up and turns off flow control for a socket associated with the flow.

28. The machine-readable medium as in claim 22 wherein turning on flow control comprises returning a specialized error code when queuing the packets for that flow.

29. The machine-readable medium as in claim 26 wherein SFB bins are logically divided into a shadow set and a current set, the shadow set copying values to the current set when the SFB hash value used by the SFB algorithm is recalculated.

30. The machine-readable medium as in claim 29 wherein the SFB bins in the current set and shadow set are separated into two levels of SFB bins, and wherein a set of data associated with each flow is stored at each of the two levels.

31. The machine-readable medium as in claim 30 wherein a different portion of the SFB hash value is used to index each of the levels of the SFB bins from both the current set and the shadow set.

32. The machine-readable medium as in claim 23 wherein each application executed on the data processing device may have multiple flows, each of which may be classified and queued in a queue associated with a service class for that flow and managed using SFB bins associated with that flow.

33. The machine-readable medium as in claim 32 wherein N flows are mapped to M transmit queues, wherein N is greater than or equal to M.

34. The machine-readable medium as in claim 22 wherein flows are explicitly set by each application.

35. The machine-readable medium as in claim 22 wherein each packet service classification has a different relative priority associated therewith.

36. The machine-readable medium as in claim 35 wherein network control packets are assigned to a packet service classification having a highest relative priority level.

37. The machine-readable medium as in claim 22 wherein the transmit queues are managed at a networking layer of the data processing device and wherein the data processing device further comprises a network driver layer in communication with the networking layer, and wherein the networking layer notifies the network driver layer when a packet is ready to be transmitted from a queue, the network driver layer then dequeues the packet from the queue and transmits the packet over a network.

38. The machine-readable medium as in claim 22 wherein packet service classifications are based on one or more of a delay tolerance level specifying how tolerant an application is to packet delay, a loss tolerance level specifying how tolerant an application is to packet loss, and an elasticity of flow level specifying how tolerant an application is to changes in bandwidth.

39. The machine-readable medium as in claim 38 wherein packet service classifications having relatively lower delay tolerance level associated therewith are given relatively higher priority compared with packet service classifications having relatively higher delay tolerance levels.

40. The machine-readable medium as in claim 38 wherein packet service classifications having relatively lower loss tolerance associated therewith are given relatively higher priority compared with packet service classifications having relatively higher loss tolerance.

41. The machine-readable medium as in claim 38 wherein packet service classifications having relatively lower elasticity of bandwidth associated therewith are given relatively higher priority compared with packet service classifications having relatively higher elasticity of bandwidth.

42. The machine-readable medium as in claim 38 wherein one or more of the following packet service classifications are used:
  background system-initiated;
  background;
  best effort;
  responsive data;
  operations, administration, and management;
  multimedia audio/video streaming;
  responsive multimedia audio/video;
  interactive video;
  interactive audio; and
  network control.

\* \* \* \* \*